United States Patent
Bhattacharya

(10) Patent No.: US 9,210,075 B2
(45) Date of Patent: Dec. 8, 2015

(54) METHOD AND APPARATUS FOR MANAGING END-TO-END CONSISTENCY OF BI-DIRECTIONAL MPLS-TP TUNNELS VIA IN-BAND COMMUNICATION CHANNEL (G-ACH) PROTOCOL

(71) Applicant: Ciena Corporation, Hanover, MD (US)

(72) Inventor: Somen Bhattacharya, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 123 days.

(21) Appl. No.: 14/048,719

(22) Filed: Oct. 8, 2013

(65) Prior Publication Data

US 2015/0098356 A1 Apr. 9, 2015

(51) Int. Cl.
*H04L 12/28* (2006.01)
*H04L 12/723* (2013.01)

(52) U.S. Cl.
CPC ..................... *H04L 45/50* (2013.01)

(58) Field of Classification Search
None
See application file for complete search history.

(56) References Cited

U.S. PATENT DOCUMENTS

2008/0144641 A1* 6/2008 Le Roux et al. ............... 370/401
2014/0010072 A1* 1/2014 Gandhi et al. ................ 370/228

OTHER PUBLICATIONS

Zhang et al, RSVP-TE Extensions to Establish Associated Bidirectional LSP, Internet-Draft, 11 pages, Apr. 2011.*
Zhang et al, RSVP-TE Extentions to Realize Dynamic Binding of Associated Bidirectional LSP, Internet-Draft, 9 pages, Mar. 2010.*

* cited by examiner

*Primary Examiner* — Frank Duong
(74) *Attorney, Agent, or Firm* — Clements Bernard PLLC; Christopher L. Bernard; Lawrence A. Baratta, Jr.

(57) ABSTRACT

A source node encapsulates, in a data plane protocol packet, a forward tunnel control message according to a control plane protocol and having an Extended Association Object, and forwards the data plane protocol packet from a source node to a destination node, through a data plane channel. The destination node extracts the Extended Association Object from the data plane protocol packet. Based, at least in part, on the extracted Extended Association Object, the destination node provisions a reverse tunnel from the destination node to the source node, and binds the forward tunnel to the reverse tunnel.

19 Claims, 11 Drawing Sheets

METHOD AND APPARATUS FOR MANAGING END-TO-END CONSISTENCY OF BI-DIRECTIONAL MPLS-TP TUNNELS VIA IN-BAND COMMUNICATION CHANNEL (G-ACH) PROTOCOL

FIELD OF DISCLOSURE

The present application generally relates to bi-directional links in multiprotocol label switching networks, and in particular, to provisioning, monitoring and tearing down bi-directional links.

BACKGROUND

Multi-Protocol Label Switching (MPLS)-Transport Protocol (TP)) is a network protocol for transport of client traffic that encapsulates the independent of client network protocol. An MPLS-TP network can be formed by a label switching routers (LSRs), each connected by a data plane link to one or more immediate neighbor LSRs, or to one among a plurality of label edge routers (LERs) located at various edges of the MPLS-TP network.

MPLS-TP is a profile of MPLS, comprising a subset of the MPLS protocol suite, e.g., certain MPLS functions disabled or omitted, with certain additions or extensions, generally to meet transport network requirements. As known to persons of ordinary skill in the art, MPLS-TP can be carried over physical transport technologies, for example, SONET/SDH, OTN/WDM, and Gigabit Ethernet.

In conventional technique MPLS-TP networks, the term "bi-directional associated tunnel" refers to an arrangement of two uni-directional tunnels, extending opposite one another between the same end-points within the network. The end-points may be two label switching routers (LSRs) at respective "edges" of MPLS-TP network. Specifications and definitions for MPLS-TP networks are published in, for example, Internet Engineering Task Force (IETF) Request for Comment (RFC) document RFC 5654, and elsewhere. The two opposite direction tunnels can be associated with one another by an association binding established in the provisioning of the bi-directional associated tunnel. The provisioning of the bi-directional associated tunnel can be performed by network control signaling that uses a dynamic signaling protocol such as, for example, an extension of Resource Reservation Protocol-Traffic Engineering (RSVP-TE) signaling. The term "dynamic," in this context, generally refers to a control signaling protocol having low enough latency and sufficient bandwidth to provide on-the-fly changing of network parameters, to quickly adapt to client application-specific transport requirements. Provisioning of a bi-directional associated tunnel through control signaling according to dynamic signaling protocol can enable a verifying of the association binding.

Conventional techniques exist for provisioning of bi-directional associated tunnel tunnels in MPLS-TP networks using a static network control signaling protocol not within the GMPLS-RSVP-TE signaling control plane. The conventional techniques include end-point association, at both end-points, of the forward and reverse member LSPs. However, CLI based end-point association of a forward LSP and a reverse LSP is only known to each end-point locally. Neither of the two end-points can verify that the two LPS(s) are also associated at the other (i.e., remote) end-point. This inability to verify can be associated with fault conditions such as traffic black hole due, for example, to miss-configuration or missing configuration.

SUMMARY

Systems and methods according to various exemplary embodiments can include features and benefits such as, but not limited to, data-plane exchange of control plane protocol tunnel control messages, including, without limitation, messaging for dynamic provisioning and teardown of bi-directional associated tunnel tunnels and pseudo-wires through MPLS-TP networks.

In an aspect, systems and methods providing in-plane exchange of tunnel control messages in accordance with various exemplary embodiments can exploit, and can supplement certain features of the Generic Associated Channel (G-ACH) Advertisement Protocol' (GAP) channel, including packet structures capable of carrying tunnel control messages, and various novel objects including objects identifying end-point nodes, LSP labels, and associations.

Methods according to various exemplary embodiments can include provisioning a bi-directional associated tunnel in an MPLS-TP network of nodes and, in accordance with various aspects, can include dynamic provisioning a forward tunnel in a data plane from a source node to a destination node, wherein the dynamic provisioning can include in-band messaging of a forward tunnel dynamic control message, structured with a dynamic control plane protocol and, in a further aspect, having an Extended Association Object, through a given forward data channel, in the data plane, between the source node and the destination node. In an aspect, methods according to various exemplary embodiments can include, in provisioning a bi-directional associated tunnel, provisioning a reverse tunnel from the source node to the destination node, wherein the provisioning can include in-band messaging of a reverse tunnel dynamic control message, having a field for a copy of the Extended Association Object, through a given reverse data channel in a between the destination node and the source node.

In an aspect, methods according to various exemplary embodiments can further include the forward data channel being according to a given data plane protocol and, in a further aspect, the in-band messaging can include encapsulating the forward tunnel dynamic control message in a forward data packet structured with the data plane protocol and forwarding the forward data packet to the destination node through the forward data channel.

In an aspect, methods according to various exemplary embodiments can further include, in provisioning the reverse tunnel, receiving the forward data packet at the destination node, extracting the Extended Association Objection from the received forward data packet, generating the reverse tunnel dynamic control message at the destination node, wherein the generating can include copying the extracted Extended Association Object into the field for a copy of the Extended Association Object, encapsulating the reverse tunnel dynamic control message in a reverse data packet structured with the data plane protocol and forwarding the reverse data packet to the source node through a reverse data channel in the data plane.

In a further aspect, methods according to various exemplary embodiments can further include, in provisioning the reverse tunnel, a binding at the destination node of the reverse tunnel to the forward tunnel based, at least in part, on the extracted Extended Association Object.

In an aspect, methods according to various exemplary embodiments can further include, in dynamic provisioning a forward tunnel, storing, at the source node, a copy of the Extended Association Object, and can also comprises a conditional binding, at the source node, of the forward tunnel to the reverse tunnel, wherein the conditional binding can include the source node receiving the reverse data packet, extracting the Extended Association Object from the field for a copy of the Extended Association Object, comparing the extracted Extended Association Object to the stored Extended Association Object and, if the comparing indicates a match, binding the forward tunnel to the reverse tunnel.

Example systems according to various exemplary embodiments can provide provisioning a bi-directional associated tunnel in an MPLS-TP network of nodes, and can include means for dynamic provisioning a forward tunnel in a data plane from a source node to a destination node, configured to include in the provisioning an in-band messaging within the data plane, between the source node and the destination node, and means for provisioning a reverse tunnel from the source node to the destination node, which, in an aspect, can be configured to include in the provisioning an in-band messaging within the data plane of a reverse tunnel dynamic control message.

One example MPLS-TP router according to various exemplary embodiments can include a control plane processor module, configured to generate a dynamic tunnel control message according to a given control plane protocol, an encapsulation module, coupled to the control plane processor module, configured to encapsulate the dynamic tunnel control message in a data packet according to a given data plane protocol, a data channel interface module, coupled to the encapsulation module, and configured to interface with a given data plane channel, and further configured to forward the data packet through the given data plane channel to another MPLS-TP router.

In an aspect, one example MPLS-TP according to various exemplary embodiments can further include, a detection module, coupled to the data channel interface module, that can be configured to detect that the received data packet is structured according to the data plane protocol and that it encapsulates another dynamic tunnel control message, and an extraction module, coupled to the detection module, configured to extract an information from the dynamic tunnel control message of the detected received data packet.

Other aspects and advantages associated with the embodiments disclosed herein will become apparent to those skilled in the art based on the accompanying drawings and detailed description.

BRIEF DESCRIPTION OF THE DRAWINGS

The accompanying drawings are presented to aid in the description of the embodiments disclosed herein and are provided solely to illustrate exemplary features associated with the disclosed embodiments without defining any limitations thereof.

DETAILED DESCRIPTION

Figure 1:
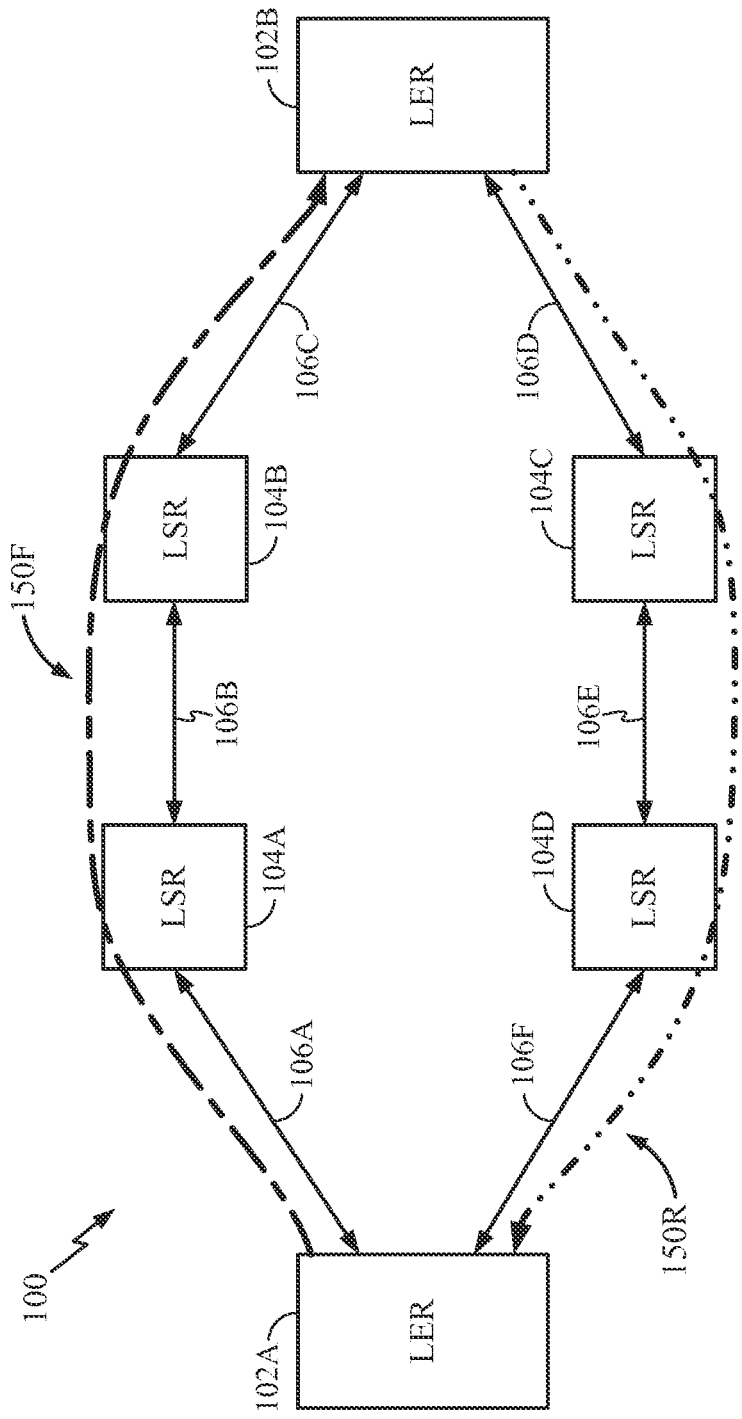
FIG. 1 shows one example of one general high-level topology for an unprotected bi-directional associated tunnel through one example MPLS-TP network.

Aspects are disclosed in the following description and related drawings to show specific examples relating to various exemplary embodiments relating to technique. However, alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, discussion of a feature, advantage or mode of operation in reference to "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Table 1 lists Internet Engineering Task Force (IETF) Request for Comment (RFC) documents that may relate to one or more aspects of various exemplary embodiments.

second end-point LER 102B. In the context of the bi-directional associated tunnel 150, the forward LSP 150F will be alternatively referenced as the "primary associated forward tunnel" 150F, and the reverse LSP 150R will be alternatively referenced as the "primary associated reverse tunnel" 150R. For brevity, the term "bi-directional associated tunnel" will be recited in alternative, abbreviated form as "BDA tunnel" The primary associated forward tunnel 150F is formed as a three-hop LSP supported by the first end-point LER 102A, link 106A, transit LSR 104A, link 106B, transit LSR 104B, and second end-point LSR 102B. The primary associated reverse tunnel 150R is, for this example, also formed as a three-hop LSP supported by the second end-point LER 102B, link 106D, transit LSR 104C, link 106E, transit LSR 104C, and first end-point LSR 102A.

For convenience in describing example operations, the first end-point LER 102A and second end-point 102B will be alternatively referenced, collectively, as "the end-point LSRs 102," and will be alternatively referenced, generically, as "an end-point LER 102." For like reasons, the transit LSRs 104A,

TABLE 1

| | |
|---|---|
| RFC 3209 | RSVP-TE: Extensions to RSVP for LSP Tunnels |
| RFC 3270 | Multi-Protocol Label Switching (MPLS) Support of Differentiated Services |
| RFC 3471 | Generalized Multi-Protocol Label Switching (GMPLS) Signaling Functional Description. |
| RFC 3473 | Generalized Multi-Protocol Label Switching (GMPLS) Signaling Resource Reservation Protocol- Traffic Engineering (RSVP-TE) Extensions |
| RFC 3564 | Requirements for Support of Differentiated Services-aware MPLS Traffic Engineering |
| RFC 3985 | Pseudo Wire Emulation Edge to Edge (PWE3) Architecture |
| RFC 3945 | Generalized Multi-Protocol Label Switching (GMPLS) Architecture |
| RFC 4124 | Protocol Extensions for Support of Diffserv-aware MPLS Traffic Engineering. |
| RFC 4202 | Routing Extensions in Support of Generalized Multi-Protocol Label Switching (GMPLS) |
| RFC 4203 | OSPF Extensions in Support of Generalized Multi-Protocol Label Switching (GMPLS) |
| RFC 4206 | Label Switched Paths (LSP) Hierarchy with Generalized Multi-Protocol Label Switching GMPLS) Traffic Engineering (TE) |
| RFC 4426 | Generalized Multi-Protocol Label Switching (GMPLS) Recovery Functional Specification |
| RFC 4726 | A Framework for Inter-Domain Multiprotocol Label Switching Traffic Engineering |
| RFC 4762 | Virtual Private LAN service (VPLS) using Label Distribution Protocol (LDP) signaling |
| RFC 4872 | RSVP-TE Extensions in Support of End-to-End Generalized Multi-Protocol Label Switching (GMPLS) Recovery |
| RFC 4873 | GMPLS Segment Recovery |
| RFC 5150 | Label Switched Path Stitching with Generalized Multiprotocol Label Switching Traffic Engineering (GMPLS TE) |
| RFC 5151 | Inter-Domain MPLS and GMPLS Traffic Engineering - Resource Reservation Protocol-Traffic Engineering (RSVP-TE) Extensions |
| RFC 5305 | IS-IS Extensions for Traffic Engineering |
| RFC 5307 | IS-IS Extensions in Support of Generalized Multi-Protocol Label Switching (GMPLS). |
| RFC 5586 | MPLS Generic Associated Channel |
| RFC 5654 | Requirements of an MPLS Transport Profile |
| RFC 5659 | An Architecture for Multi-Segment Pseudowire Emulation Edge-to-Edge |
| RFC 5921 | A Framework for MPLS in Transport Networks |
| RFC 5960 | MPLS Transport Profile Data Plane Architecture |
| RFC 6073 | Segmented Pseudowire |
| RFC 6107 | Procedures for Dynamically Signaled Hierarchical Label Switched Paths |
| RFC 6370 | MPLS Transport Profile (MPLS-TP) Identifier |
| RFC 6372 | MPLS Transport Profile (MPLS-TP) Survivability Framework |
| RFC 6373 | MPLS Transport Profile (MPLS-TP) Control Plane Framework |

FIG. 1 shows one example of one MPLS-TP network 100 having one bi-directional associated tunnel 150 comprising a forward LSP 150F and a reverse LSP 150R, extending in opposite directions between a first end-point LER 102 and a

104B, 104C and 104D will be alternatively referenced, collectively, as "the transit LSRs 104," and will be alternatively referenced, generically, as "an LSR 104." Likewise, the links 106A, 106B, 106C, 106D, 106E, and/or 106F are alternatively referenced in this disclosure, generically, as "a link 106" and, collectively, as "links 106."

It is assumed that each of the end-point LERs 102 and transit LSRs 104 includes resources to support and perform MPLS-TP label switching, for example, according to known, conventional MPLS-TP packet forwarding mechanisms.

It is further assumed that the end-point LERs 102 include the capability of computing a node-by-node explicit path layout, defining an explicit path, from example, from one of first end-point LER 102A and/or second send-point LER 102B to the other of the LERs 102, as a hop-by-hop path through the transit LSRs 104. Such path computing, in practices according to various exemplary embodiments, can be in accordance with known conventional MPLS-TP network techniques. Therefore, further detailed description of such techniques will be omitted.

Referring to FIG. 1, it will be understood that the quantity of transit LSRs 104 forming the primary associated forward tunnel 150F, and the quantity of transit LSRs 104 forming the primary associated reverse tunnel 150R, can be much larger than the quantities shown in FIG. 1. It will also be understood that the quantity of transit LSRs 104 forming the primary associated forward tunnel 150F is not necessarily equal to the quantity of transit LSRs 104 forming the primary associated reverse tunnel 150R.

Links 106 can be implemented in accordance with known, conventional MPLS-TP link techniques. In addition, each of the links 106 can be configured, in accordance with known conventional MPLS-TP techniques, to support one or more tunnels (not explicitly shown) for transporting traffic in accordance with MPLS-TP specifications. It will be assumed that each of the links 106, or at least each of the links 106 carrying tunnel control messages in-plane in accordance with various exemplary embodiments, supports or is capable of supporting at least one MPLS Generic Associated Channel (G-ACH) Advertisement Protocol' (GAP) channel, for example, in accordance with known, conventional GAP protocol.

The LERs 102 can be configured to push or pop LSP labels of packets entering and leaving the MPLS-TP network 100. Conventional techniques, not specific to the disclosed embodiments, for push and pop of the LSP labels can be used. Such techniques are known to persons of ordinary skill, and therefore further detailed description is omitted. Likewise, the transit LSRs 104A and 104B, can function as MPLS-TP P routers for provisioning the multi-segment LSPs, as described in greater detail later in this disclosure, between the first end-point LER 102A and second end-point 102B, and will therefore be referenced alternatively as the "MPLS-TP P router 104A" and the "MPLS-TP P router 104B," respectively.

It will be understood that the LERs 102, the transit LSRs 104, and the links 106 support at least one MPLS G-ACH Advertisement Protocol' (GAP) channel, for example, in accordance with known, conventional GAP protocol. The G-ACH header and the GAP protocol are known, or readily referenced, by persons of ordinary skill and, therefore, reproduction in this disclosure is not necessary for such persons to practice in accordance with the described embodiments. Example extensions of the GAP protocol according to various exemplary embodiments are described in greater detail at later sections of this disclosure.

Aspects for extending the GAP protocol, and related packet structure, for in-plane signaling and exchange of tunnel control messages, and related provisioning and management of BDA tunnels, in accordance with various exemplary embodiments are described. Aspects and examples are described in detail sufficient to enable persons of ordinary skill in the art, upon reading this entire disclosure, for example, by various modifications, extensions and adaptations of known, conventional GAP techniques that will become apparent to such persons from such reading, to practice according to various exemplary embodiments without undue experimentation.

Techniques according to various exemplary embodiments can provide, among other features, dynamic control of bi-directional associated tunnels within an MPLS-TD network, by exchanging tunnel control messages (not shown in FIG. 1), for example, set-up and teardown messages, through high-speed channels (not shown in FIG. 1) in the data plane to which the end-point LERs 102 and transit LSRs 104 interface.

In an aspect, exchanging tunnel control messages between and among the end-point LERs 102 and transit LSRs 104 can include an initiating node, for example first end-point LER 102A, generating a content of a tunnel control message, e.g., instructions and operative parameters for a tunnel control, then encapsulating the tunnel control message in a particularly structured data packet. Examples of particular structure of the data packet are described in greater detail at later sections.

In one aspect, method and systems according to various exemplary embodiments can include MPLS-TP network nodes, for example, the end-point LERs 102 and transit LSRs 104 having resources configured to detect and distinguish the particularly structured data packets that are encapsulating a tunnel control message.

In a related aspect, MPLS-TD network nodes such as the end-point LERs 102 and transit LSRs 104 can have resources to extract the tunnel control message from received ones of the particularly structured data packet encapsulating the tunnel control messages, and to perform appropriate responding operations. Further to this aspect, MPLS-TD network nodes such as the LERs 102 and LSRs 104 can be provided with resources, such as described in greater detail at later sections, to encapsulate various kinds of responsive tunnel control messages into a particularly structured data packet, and sending or forwarding it through a channel in the data plane, to a destination node. In a further aspect, MPLS-TD network interim nodes such as the LSRs 104 can have resources re-encapsulate a received and extracted tunnel control message having an end-point destination, into a particularly structured data packet, and forward that particularly structured data packet, through a channel in the data plane, to that end-point destination.

In an aspect, various exemplary embodiments can include, as one particular structure for the particularly structured data packets that encapsulate and carry tunnel control messages, certain extensions of the G-ACH header packet format of draft standard 'MPLS Generic Associated Channel (G-ACH) Advertisement Protocol' (GAP). The G-ACH header and the GAP protocol are known, or readily referenced, by persons of ordinary skill and, therefore, reproduction in this disclosure is not necessary for such persons to practice in accordance with the described embodiments. Example extensions of the GAP protocol according to various exemplary embodiments are described in greater detail at later sections of this disclosure.

Example operations illustrative of certain concepts are described in reference to data packets encapsulating tunnel control messages having structure based on extensions of GAP, and that are communicated in-band through G-ACH. Such description is not intended to limit the scope of embodiments to encapsulating data packets being structured based on extensions of GAP, or to the in-band communication of tunnel control messages being through G-ACH. On the contrary, it will be understood that persons of ordinary skill, upon reading the present disclosure or practicing its concepts, can readily adapt the described operations that use or reference the G-ACH control channel into equivalent operations that may be performed on other dedicated data plane channels of similar kind, if any, that may be established in the future.

In addition, operations illustrative of certain concepts are described in reference to tunnel functionality according to RSVP-TE. Such description is not intended to limit the scope of embodiments to tunnel control messages having functionalities mirroring those provided by known, conventional RSVP-TE signaling.

In operations according to various exemplary embodiments, in band tunnel control messaging from a first node to a second node can include one or more systems or schemes for identifying nodes and tunnel. Some examples are described in reference to a "source node," a "destination node." It will be understood that in describing certain operations, "source node" and "destination node" can be specific to a given one of the two, opposite unidirectional LSPs forming a BDA tunnel between a two end-points, e.g., a first node and a second node. It will also be understood that in describing certain other operations relating to tunnel setup or teardown in accordance with various exemplary embodiments, one of two end-points of a BDA tunnel can be termed a "source" node, and the other a "destination" node, even though the two nodes are connected by a BDA tunnel.

In an aspect, associated with a forward LSP formed in provisioning a BDA tunnel, there may be a pair of N-tuples, in other words, a forward LSP identification N-tuple pair. A first N-tuple of the forward LSP identification N-tuple pair may identify the forward LSP relative to its source node, and the second N-tuple of the forward LSP identification N-tuple pair may identify the forward LSP relative to the destination endpoint node. Examples are described in greater detail in reference to FIGS. 3A-3C. Similarly, associated with a reverse LSP formed in provisioning a BDA tunnel, there may be a reverse LSP identification N-tuple pair. The first N-tuple of the reverse LSP identification N-tuple pair may identify the reverse LSP relative to its source end-point node (which is the destination end-point node for the forward LSP), and the second may identify the reverse LSP relative to the destination node (which is the source end-point node for the forward LSP). Examples are described in greater detail in reference to FIGS. 3A-3C.

In an aspect, the above-described N-tuples can be formed by exchange of association request and response messages, either as IP encapsulated or non-IP encapsulated packets, over the G-ACH of the LSPs.

In an aspect, the forward LSP ID and reverse LSP ID of the LSP pairs at each end point can be according to the MPLS-TP ID definitions as mentioned in RFC6370.

Example operations in processes of in-band RSVP-TE signaling in provisioning BDA tunnels are described, in reference to FIG. 2 and other figures, using a novel supplemented GAL/G-ACH protocol capable of carrying, over or through already established supplemented GAL/G-ACH channels, various types and configurations of control plane tunnel control messages. It will be understood that description using the GAL/G-ACH as the example data plane channels is not intended to limit the scope of embodiments to encapsulating data packets being structured based on supplemented structures of GAP, or to the in-band communication of tunnel control messages being through G-ACH. On the contrary, it will be understood that persons of ordinary skill, upon reading the present disclosure or practicing its concepts, can readily adapt the described operations that use or reference the G-ACH control channel into equivalent operations that may be performed on other dedicated data plane channels of similar kind, if any, that may be established in the future.

For convenience in understanding concepts, names of example packets and packet types structured with the supplemented G-ACH protocol according to the exemplary embodiments will include names of current conventional RSVP-TE messages having comparable tunnel control functions.

One general packet type structured with one supplemented GAL/G-ACH protocol according to various exemplary embodiments will be generically referenced in this disclosure as "S-GAL/G-ACH(TNL-CNTL)" packets. It will be understood that "S-GAL/G-ACH(TNL-CNTL) packet" is only a reference name, having no inherent meaning. In an aspect, various S-GAL/G-ACH(TNL-CNTL)) packets can encapsulate, in a body portion, tunnel provisioning instructions and parameters comparable to certain tunnel provisioning instructions and parameters of a known, conventional, control plane RSVP-TE tunnel provisioning messages. In a further aspect, examples of "S-GAL/G-ACH(TNL-CNTL)" packets can include an S-GAL/G-ACH(PATH) packet. One or more S-GAL/G-ACH(PATH) packets in accordance with various exemplary embodiments can encapsulate, in a body portion, tunnel provisioning instructions and parameters comparable to the tunnel provisioning instructions and parameters of a known, conventional control plane protocol RSVP-TE PATH message. The S-GAL/G-ACH(PATH) packet can have an extended GAL label that includes various additional objects and parameters particular to practices according to the exemplary embodiments, which are not provided in known, conventional GAL/G-ACH specifications, as will be described in greater detail at later sections of this disclosure. Another example of "S-GAL/G-ACH(TNL-CNTL)" packets in accordance with various exemplary embodiments can encapsulate, in a body portion, tunnel provisioning instructions and parameters comparable to the tunnel provisioning instructions and parameters of a known, conventional RSVP-TE RESV message As previously described, in an aspect, nodes within an MPLS-TP network supporting practices according to various exemplary embodiments can be configured to detect, at their interface to an assigned GAL of a G-ACH, S-GAL/G-ACH (TNL-CNTL)" packets and other particularly structured data plane packets encapsulating control plane protocol tunnel control messages.

Figure 2A:
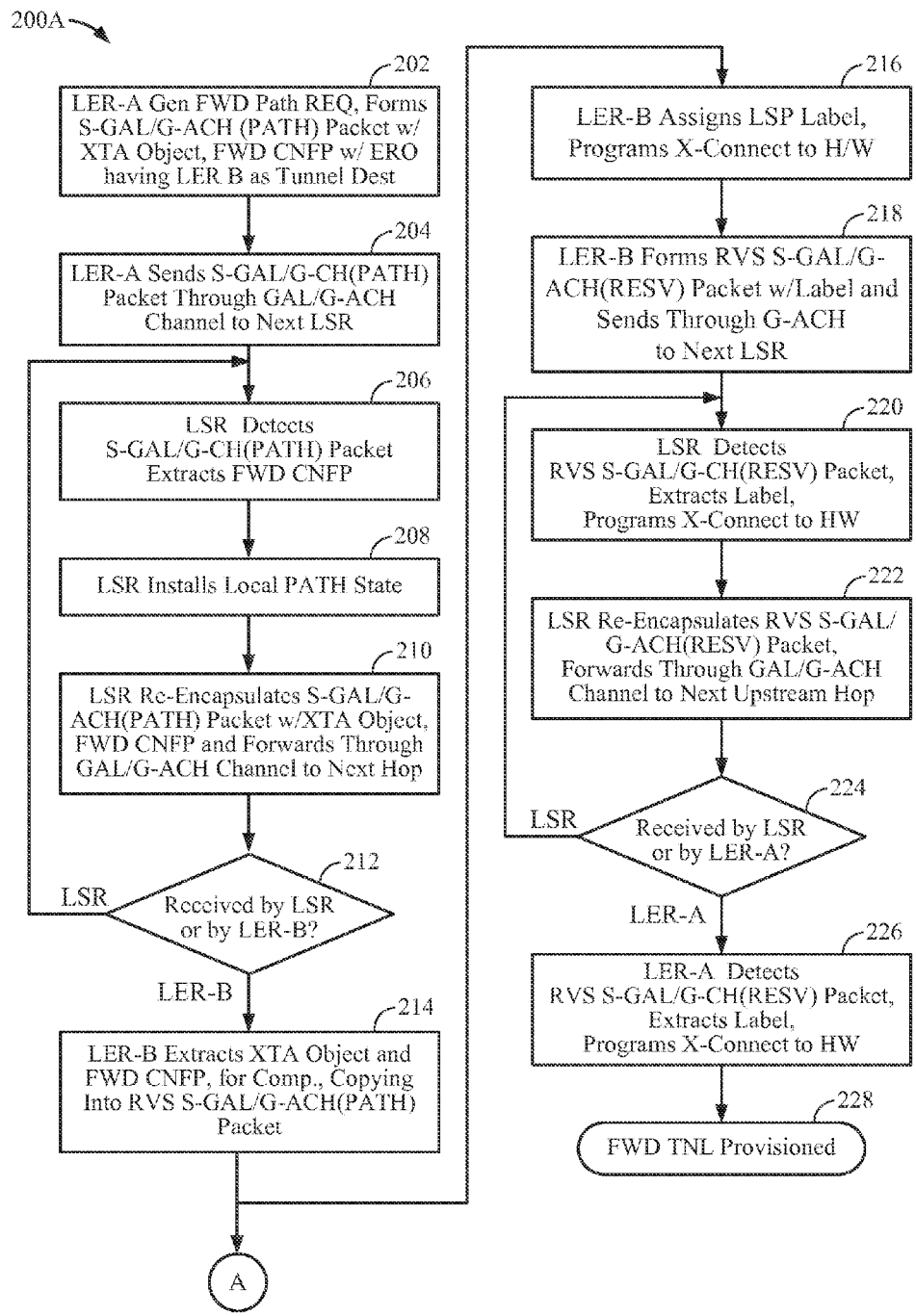
FIG. 2A shows one example flow of forward tunnel provisioning operations in one in-band tunnel control plane process for single-sided controlled associated LSP set-up of a bi-directional associated tunnel on the FIG. 1 example MPLS-TP topology, in accordance with one or more exemplary embodiments.
Figure 2B:
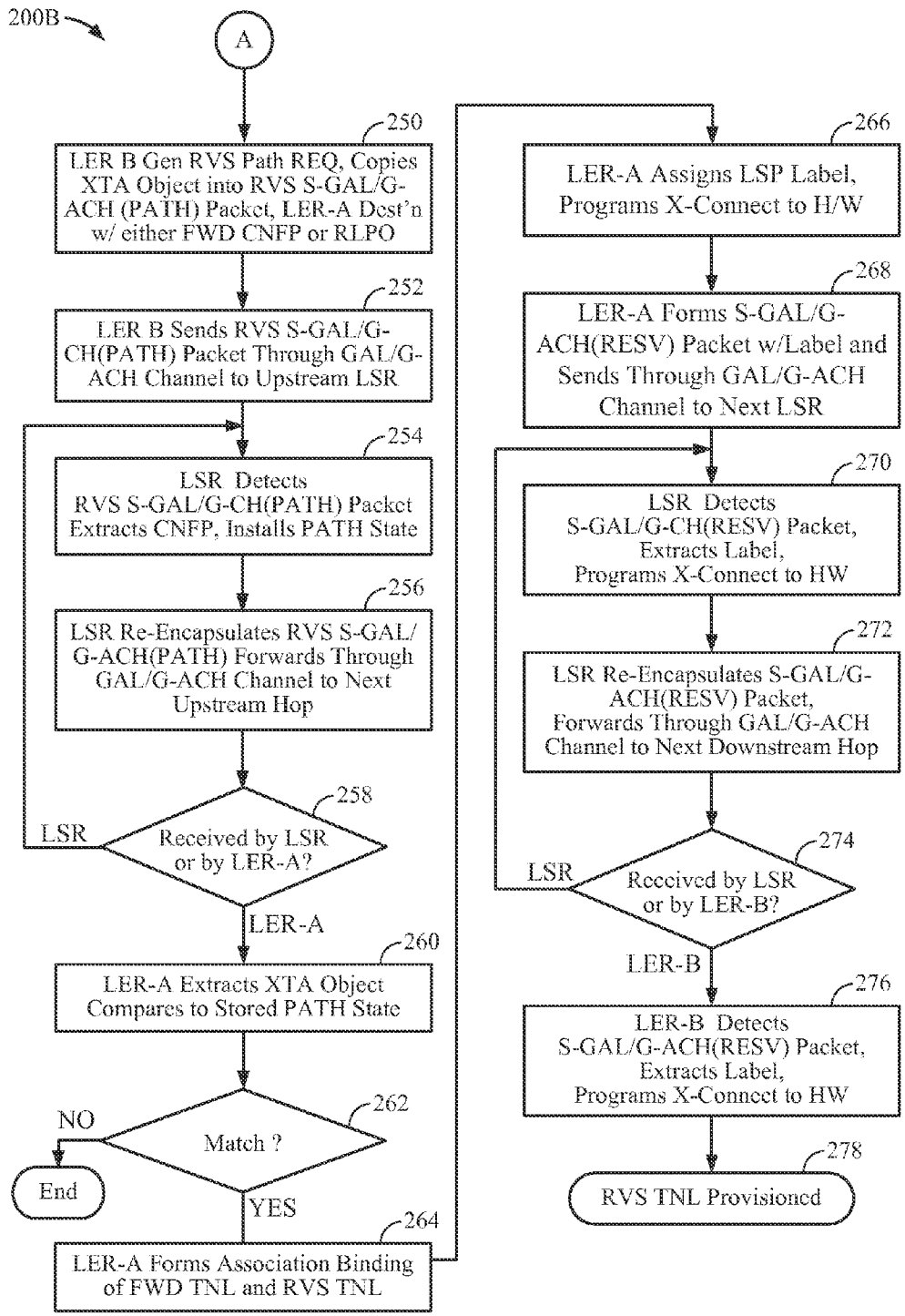
FIG. 2B shows one example flow of reverse tunnel provisioning operations in one in-band tunnel control plane process for one single-sided controlled associated LSP set-up of a bi-directional associated tunnel on the FIG. 1 example MPLS-TP topology, in accordance with one or more exemplary embodiments.

FIGS. 2A and 2B shows example flow 200A of operations in one forward tunnel provisioning, and flow 200B of operations in one reverse tunnel provisioning, respectively, in one in-band tunnel control plane process for single-sided controlled associated LSP set-up of a BDA tunnel. Examples according to the FIGS. 2A and 2B operational flow will refer to the FIG. 1 example MPLS-TP network 100. Operations according to the FIG. 2A flow 200A can dynamically provision—by encapsulating in a S-GAL/G-ACH(PATH) packet—a dynamic tunnel provisioning request according to a control plane protocol through a data plane channel a forward tunnel from a first or source endpoint LER-A, for example, the FIG. 1 LER 102-A, to a second or destination endpoint LER-B, for example the FIG. 1 LER 102-B, through transit LSRs, for example, the FIG. 1 transit LSRs 104A and 104B. As will be appreciated, Operations including in-band communications of control plane protocol messages according to the FIG. 2B flow 200B can provision a reverse tunnel from the second endpoint LER-A, for example, the FIG. 1 LER 102-A, to the first endpoint LER-B through transit LSRs, such as the FIG. 1 LSRs 104C and 104D. Operations including in-band communications of control plane communications according to the FIG. 2B flow 200B can also provide association at both the first end-point LER-A and the second end-point LER-B, of the forward and reverse tunnels, thereby providing a BDA tunnel. It will be understood that using the MPLS-TP network 100 as an example environment is not intended as a limitation of MPLS-TP topologies on which processes of single-sided provisioning, via in-band RSVP-TE signaling according to various exemplary embodiments, of a BDA tunnel may be practiced.

The FIG. 2A flow 200A and FIG. 2B flow 200B assume a supplemented G-ACH channel has been assigned to carry the S-GAL/G-ACH(TNL-CNTL) packets. It will be assumed, in describing example operations according to the flow 200, that the nodes performing and interfacing with such operations include resources for detecting S-GAL/G-ACH(PATH) packets, and other S-GAL/G-ACH(TNL-CNTL) packets, at their interfaces to GAL/G-ACH channels in their connecting links. It will also be assumed, in describing example operations according to the flow 200A and flow 200B, that nodes performing and/or interfacing with such operations include resources for extracting tunnel control messages from the S-GAL/G-ACH(TNL-CNTL) packets, and for performing tunnel set-up and teardown operations in accordance with the extracted tunnel control messages. It will be further assumed, in describing example operations according to the flow 200A and the flow 200B, that nodes performing and/or interfacing with such operations include resources for forming or re-encapsulating S-GAL/G-ACH(TNL-CNTL) packets and sending these through appropriate GAL/G-ACH channels in their connecting links Referring to FIG. 2A, one example operation according to the flow 200A may begin at 202 where an MPLS-TP first node, e.g., an edge node, referenced as "source LER-A," generates a forward tunnel provisioning request, arbitrarily labeled for this description as "FWD REQ" for dynamic provisioning a tunnel to an MPLS-TP second node, e.g., another edge node, referenced as "destination LER-B." In an aspect, the FWD REQ is a control plane message. Referring to FIGS. 1 and 2A, the FIG. 1 first end-point LER 102A can serve as the FIG. 2A source LER-A. In an aspect, FWD REQ can include instructions and parameters comparable to tunnel provisioning instructions and parameters of known, conventional RSVP-TE PATH messages.

Also at 202, source LER-A can encapsulate the FWD REQ in a supplemented G-ACH header packet, named for purposes of this description as "S-GAL/G-ACH(PATH) packet. In an aspect, the S-GAL/G-ACH(PATH) packet formed at 202 can include an Extended Association object, labeled for purposes of description as "XTA Object." Aspects of the Extended Association object will be described in greater detail at later sections of this disclosure.

In a further aspect, the S-GAL/G-ACH(PATH) packet formed at 202 can include forward Tunnel Configuration Parameters (not separately shown in FIG. 2A), named herein as "FWD CNF parameters" and, alternatively, as "FWD CNFP." FWD CNFP can include, but are not limited to, an explicit path (ERO), bandwidth parameters (not shown in FIG. 2) and OAM configurations (e.g., BFD and AIS configurations). As will be described later in reference to FIGS. 2A and 2B, the destination LER-B, upon receiving S-GAL/G-ACH(PATH), may include extraction of the FWD CNFP parameters in its in-band control plane provisioning of a reverse tunnel in accordance with various exemplary embodiments.

Referring to FIG. 2A, in an example operation according to flow 200A, after generating the S-GAL/G-ACH(PATH) packet at 202 the source LER-A may, at 204, send the S-GAL/G-ACH(PATH) packet to the neighbor transit LSR that is first in the ERO path, through a GAL/G-ACH channel in a link to that neighbor. The neighbor transit LSR will then forward the S-GAL/G-ACH(PATH) packet, through another segment of the GAL/G-ACH channel in a link to a next transit LSR, for a hop-by-hop forwarding, through a sequence of transit LSRs defined by the ERO, to the destination LER-B. As described in greater detail in reference to blocks 206, 208 and 210, each of the hops can include the transit LSR receiving the S-GAL/G-ACH(PATH) packet extracting the encapsulated control plane protocol message, e.g., RSVP-TE protocol PTH message and, in response, installing a local PATH state to the upstream LSR (or source LER-A) from which the receiving transit LSR received the S-GAL/G-ACH(PATH) packet.

As can be appreciated, among other features and benefits provided by the sending at 204 is high bandwidth transport of the S-GAL/G-ACH(PATH) packet, for dynamic control plane functionality, without a non-MPLE-TP control plane, and without overhead or bandwidth cost of establishing a data plane channel because the GAL/G-ACH channel is already extant.

Referring to FIG. 2A, in example operations according to flow 200A, at 206, the transit LSR can detect the S-GAL/G-ACH(PATH) packet sent at 204, and received through a GAL/G-ACH channel from the upstream first end-point LER-A, and can extract parameters and other information from the control plane protocol FWD Path REQ message that is encapsulated. In an aspect, the extracted information can include various portions of FWD CNFP. The term "extract," as used in this disclosure, will be understood to mean "extract all of or extract a portion or portions of," except in instances, if any, where expressly stated otherwise and in instances, if any, where made clear from reading the instance in its particular context as having a different meaning.

With continuing reference to FIG. 2A, after the extracting at 206, example operations according to flow 200A can include the transit LSR, at 208, installing a local PATH state to the upstream source LER-A from which the receiving transit LSR received the S-GAL/G-ACH(PATH) packet. The operations the transit LSR performs at 208, after the extracting at 206, in the installing of the PATH state to the upstream LER-A can be, for example, according to known, conventional PATH state install operations performed by an LSR in a conventional MPLS-TP network after receiving a conventional RSVP-TE command from an out-of-band control plane. Further detailed description of the install, at 208, of a local PATH state is therefore omitted. After installing the local PATH state to the upstream source LER-A at 208, operations according to flow can include, at 210, the LSR re-generating a substantial replica of the original S-GAL/G-ACH(PATH) packet, and forwarding the re-generated S-GAL/G-ACH(PATH) packet. In an aspect, the forwarding at 210 can be through the GAL-G-ACH channel in an MPLS-TP link to the next downstream node identified by the ERO extracted at 206. To avoid complication due to introducing new names, the S-GAL/G-ACH(PATH) packet formed by the transit LSR at 210 will be referenced as the same S-GAL/G-ACH(PATH) packet sent by the source LER-A at 204. With respect to the meaning of the 210 "re-generating," this can be, but is not necessarily, a re-encapsulating of the FWD Path REQ control plane protocol message extracted at 206.

Next, at 212, when the next node receives the S-GAL/G-ACH(PATH) packet sent at 210, subsequent operations according to flow 200A can depend on whether that next node is the destination, i.e., destination LER-B, or another transit node. If the next node at 212 is another transit LSR, the flow can return to 206, perform blocks 206, 208, 210 and 212 until the answer at 212 is "YES," in other words when the S-GAL/G-ACH(PATH) packet has reached the destination LER-B. Referring to FIGS. 1 and 2A, assuming first end-point LER 102A is the source LER-A for the S-GAL/G-ACH(PATH), the loop of blocks 206, 208, 210 and 212 ends when the S-GAL/G-ACH(PATH) packet reaches second end-point LER 102B.

Referring to FIG. 2A, in example operations according to the flow 200, after the S-GAL/G-ACH(PATH) packet reaches the destination LER-B at 212, the destination LER-B can initiate two sub-processes that, when complete, provide a BDA tunnel One of the two sub-processes can be provisioning a reverse tunnel, from the destination LER-B, through a sequence of transit LSRs, to the source LER-A. Example operations in a flow 200B, in performing a provisioning of the reverse tunnel will be described in greater detail in reference to FIG. 2B, starting at the Reference "A" jump from FIG. 2A to FIG. 2B. The other of the two sub-processes, of which example operations will be described in reference to flow 200A of FIG. 2A, can be a generating, at the destination LER-B, of a control plane protocol RSVP-TE RESV message, or functional equivalent thereof, then encapsulating that RSVP-TE control plane protocol message in a data plane packet, and hop-by-hop forwarding (in a reverse direction relative to the forward tunnel hop-by-hop forwarding) of that packet to the source LER-A, along (in a reverse order), in-band, along the same sequence of nodes traversed in the hop-by-hop forwarding described above in reference to blocks 206-212.

Referring to FIG. 2A, example operations according to flow 200A can include, at 216, the destination LER-B assigning an LSP Label for the RESV message, and programming the cross-connect local to destination LER-B. Operations the destination LER-B can perform at 216, with respect to assigning the LSP Label and programming the local cross-connect can be according to known, conventional LSP Label assignment and cross-connect programming performed at an egress LER, in a conventional MPLS-TP network in response to conventional RSVP-TE messaging received from an out-of-band control plane (not shown in the figures). Further detailed description of assigning the LSP Label and programming the local cross-connect at 216 is therefore omitted.

Continuing to refer to FIG. 2A, example operations according to flow 200A can include, after the above-described operations at 216, the destination LER-B generating an RSVP-TE control plane protocol RESV message, or a functional equivalent, and encapsulating that RESV or equivalent in a data plane packet having the above-described supplemented GAL/G-ACH protocol used for the S-GAL/G-ACH(PATH) packet to which the RESV or equivalent message responds. The data plane encapsulating packet generated at 218 will be referenced hereinafter as the "reverse S-GAL/G-ACH(RESV) packet" and, interchangeably, in shortened form as "RVS S-GAL/G-ACH(RESV) packet." It will be understood that "RVS S-GAL/G-ACH(RESV)" is only a reference name, having no inherent meaning. As will become more apparent to persons of ordinary skill upon subsequent description in this disclosure, for example, in reference to FIG. 2B, the term "reverse" and its shortened form "RVS" in the names "reverse S-GAL/G-ACH(RESV) packet" and "RVS S-GAL/G-ACH(RESV) packet" are to distinguish from a generally comparable packet that can be generated by the source LER-A in operations of provisioning the reverse tunnel from the destination LER-B to the source LER-A.

Referring to FIG. 2A, operations according to flow 200A at 218 can also include the destination LER-B sending the RVS S-GAL/G-ACH(RESV) packet to its upstream neighbor transit LSR in the ERO path traversed by the above-described S-GAL/G-ACH(PATH) packet to which the RVS S-GAL/G-ACH(RESV) packet responds. In an aspect, the sending at 218 is through a GAL/G-ACH channel in a link to that neighbor. Referring to FIGS. 1 and 2A, one example sending operation at 218 can be the second LER 102-B sending the RVS S-GAL/G-ACH(RESV) packet, through a GAL/G-ACH channel in a link 106C to transit LSR 104-B. Example operations according to flow 200A can include, after the above-described sending at 218, the upstream neighbor transit LSR detecting, at 220, the RVS S-GAL/G-ACH(RESV) packet, extracting the RESV or equivalent control plane protocol message generated at 216 and, using the LSP Label, programming its local cross-connect in its H/W.

Referring to FIG. 2A, example operations according to flow 200A can include, after the above-described extracting and programming at 220, the transit LSR, at 222, re-generating a substantial replica of the original RVS S-GAL/G-ACH (RESV) packet, and forwarding the re-generated RVS S-GAL/G-ACH(REVS) packet to the hop, i.e., next upstream node in the hop-by-hop sequence to the source LER-A. In an aspect, the forwarding at 222 can be through the GAL-G-ACH channel in an MPLS-TP link to that next upstream node. Referring to FIGS. 1 and 2A, one example forwarding operation at 222 can be the transit LSR 104B sending the RVS S-GAL/G-ACH(RESV) packet, through a GAL/G-ACH channel in the link 106B to transit LSR 104-A. To avoid complication due to introducing new names, the RVS S-GAL/G-ACH(RESV) packet formed by the transit LSR at 222 will be referenced as the same RVS S-GAL/G-ACH (RESV) packet sent by the destination LER-B at 218. With respect to the meaning of the 222 "re-generating," this can be, but is not necessarily, a re-encapsulating of the REVS or functional equivalent control plane protocol message extracted at 220.

Next, at 224, when the next upstream node receives the RVS S-GAL/G-ACH(RESV) packet forwarded at 220, subsequent operations according to flow 200A can depend on whether that next upstream node is the destination, i.e., the source LER-A, or another transit LSR. If the next upstream node at 224 is another transit LSR, the operations according to the flow 200A can return to 220, and perform blocks 220, 222, and 224 until the answer at 224 is "YES," in other words when the RVS S-GAL/G-ACH(RESV) packet has reached the source LER-A.

Referring to FIG. 2A, in example operations according to the flow 200A, after the RVS S-GAL/G-ACH(RESV) packet reaches the source LER-A at 224, that LER-A can, at 226, detect the packet, extract the LSP Label, and program the cross-connect in its H/W. The forward tunnel of the BDA tunnel being provisioned by in-band control plane operations according to flows 200A and 200B of FIGS. 2A and 2B, respectively, is then provisioned, at 228. Operations the source LER-A performs at 226, with respect to programming its local X-connect and thereby completing a provisioning of the forward tunnel, can be, for example, according to known, conventional end-point cross-connect programming performed at an ingress LER in a conventional MPLS-TP network in conventional processes of provisioning a forward tunnel from that ingress LER to an egress LER, under control of conventional RSVP-TE messaging received from an out-of-band control plane. Further detailed description of the cross-connect programming performed at 226 is therefore omitted.

FIG. 2B shows one example flow 200B of reverse tunnel provisioning operations in one in-band tunnel control plane process for one single-sided controlled associated LSP set-up of a BDA tunnel on the FIG. 1 example MPLS-TP network 100, in accordance with one or more exemplary embodiments.

Referring to FIG. 2B, operations according to flow 200B can include, at 250, the destination LER-B generating a reverse tunnel provisioning request, arbitrarily labeled for this description as "RVS REQ" for provisioning a reverse tunnel to source LER-A. The RVS REQ can be according to the same control plane protocol as FWD REQ generated in FIG. 2A flow 200A, i.e., an RSVP PATH message. In an aspect, the destination LER-B at 250 encapsulates RVS REQ in a reverse data packet, according to the same data plane protocol as the S-GAL/G-ACH(PATH) packet described in reference to FIG. 2A. Assuming RVS REQ is generated as an RSVP-TP PATH message, the reverse data packet will be labeled "RVS S-GAL/G-ACH(PATH)." In an aspect, the destination LER-B includes (e.g., from calculations in generating the PATH message, a reverse tunnel ERO (not explicitly visible in FIG. 2B) defining a path for the reverse tunnel, i.e., a path from LER-B to source LER-A. It may be assumed that the reverse tunnel ERO has no nodes in common with the forward tunnel ERO other than LER-A and LER-B.

With continuing reference to FIG. 2B, block 250, in an aspect, destination LER-B can be configured to generate, for conditional inclusion in RVS S-GAL/G-ACH(PATH), a set of reverse path tunnel configuration (RVS CNF) parameters. If LER-B does not generate RVS CNF parameters, it can copy the FWD CNF parameters into the RVS S-GAL/G-ACH (PATH) packet. In an aspect, if LER-B does generate RVS CNF parameters, operations according to 250 can compare these to FWD CNF parameters extracted from the S-GAL/G-ACH(PATH) packet at FIG. 2A flow 200A block 214 and, if there is a mismatch, can place these in the RVS S-GAL/G-ACH(PATH) packet as a separate optional 'REVERSE_LSP_PARAMS Object' (RLPO) (not shown in FIG. 2B).

Continuing to refer to FIG. 2B, in example operations according to flow 200B, after generating the RVS S-GAL/G-ACH(PATH) packet at 250, the destination LER-B may, at 252, send the RVS S-GAL/G-ACH(PATH) packet to the neighbor transit LSR that is first in the reverse ERO path, through a GAL/G-ACH channel in a link to that neighbor. Referring to FIGS. 1 and 2B, an example sending at 252 can be a sending of the RVS S-GAL/G-ACH(PATH) packet from destination 102-B to transit LSR 104-C. In example operations according to the flow 200B, at 254, the neighbor transit LSR can detect the RVS S-GAL/G-ACH(PATH) packet sent at 252, and received through a GAL/G-ACH channel from the upstream (relative to the direction of the reverse tunnel being formed) destination LER-B, and can extract parameters and other information from the RSVP-TE PATH message that is encapsulated. In an aspect, the extracted information can include various portions of FWD CNFP (or the RLPO if included). Example operations at 254 according to flow 200B can include the transit LSR installing a local PATH state to the upstream destination LER-B from which the receiving transit LSR received the RVS S-GAL/G-ACH(PATH) packet.

After installing the local PATH state to the upstream destination LER-B at 254, operations according to flow 200B can include, at 256, the transit LSR re-generating a replica or substantial replica of the original RVS S-GAL/G-ACH (PATH) packet, and forwarding the re-generated S-GAL/G-ACH(PATH) packet to the next downstream node identified by the ERO extracted at 254. To avoid complication due to introducing new names, the RVS S-GAL/G-ACH(PATH) packet formed by the transit LSR at 256 will be referenced as the same RVS S-GAL/G-ACH(PATH) packet sent by the destination LER-B at 252. The term "re-generating" in this context can be, but is not necessarily, a re-encapsulating of the RVS Path REQ control plane protocol message extracted at 254.

Next, at 258, when the next node receives the RVS S-GAL/G-ACH(PATH) packet sent at 256, subsequent operations according to flow 200B can depend on whether that next node is the destination, i.e., source LER-A, or another transit node. If the next node at 258 is another transit LSR the flow can return to 254, and perform blocks 254, 256, and 258 until the answer at 258 is "YES." When the answer at 258 is "NO," meaning the RVS S-GAL/G-ACH(PATH) packet has reached the source LER-A, operations according to flow 200B can, at 260, extract the Extended Object that LER-B, at 250, copied from the S-GAL/G-ACH(PATH) packet into the RVS S-GAL/G-ACH(PATH) packet, and compare the extracted Extended Object to the stored Extended Object which it inserted in the S-GAL/G-ACH(PATH) packet generated at block 202 of the FIG. 2A flow 200A. If there is no match, some error may have occurred, and the reverse tunnel associated with the RVS S-GAL/G-ACH(PATH) packet cannot be verified as associated with the forward tunnel associated with the S-GAL/G-ACH(PATH) packet. As represented by the "NO" branch from the decision block 262, a result of such a mismatch can be an END of the flow 200B.

If, on the other hand, the comparison at 260 indicates a match then, as represented by the "YES" branch from decision block 262, in example operations according to flow 200B source LER-A can, at 264, perform an association binding the forward tunnel formed by operations according to FIG. 2A flow 200A with the reverse tunnel being formed by operations according to FIG. 2B flow 200B. Next, after the binding at 264, in operations according to flow 200B, the source LER-A can, at 266, assign an LSP Label and program its local cross-connect in its H/W, and then, at 268 generate an RSVP-TE protocol RESV message, encapsulate this in an S-GAL/G-ACH(RSVP) packet and send the S-GAL/G-ACH(RSVP) packet to its neighbor transit LSR, though from which it received the RVS S-GAL/G-ACH(PATH) packet at 260. In an aspect, the sending at 268 can be through the GAL-G-ACH channel in an MPLS-TP link to that neighbor transit LSR. Referring to FIGS. 1 and 2B, one example sending at 268 can be the first end-point LER 102_A sending the S-GAL/G-ACH(RESV) packet, through a GAL/G-ACH channel in the link 106F to transit LSR 104-D. Next, at 270, the receiving transit LSR can detect the S-GAL/G-ACH(RESV) packet, extract the Label assigned at 266, program it cross connect to its local H/W, and then, at 272, the transit LSR can re-generate a substantial replica of the S-GAL/G-ACH(RESV) packet it detected at 270, and forward the re-generated S-GAL/G-ACH(REVS) packet to the hop, i.e., next node in the hop-by-hop sequence to the destination LER-B. In an aspect, the forwarding at 272 can be through the GAL-G-ACH channel in an MPLS-TP link to that next node. Referring to FIGS. 1 and 2B, one example forwarding operation at 272 can be the transit LSR 104D sending the S-GAL/G-ACH(RESV) packet, through a GAL/G-ACH channel in the link 106C to transit LSR 104-C. To avoid complication due to introducing new names, the S-GAL/G-ACH(RESV) packet formed by the transit LSR at 272 will be referenced as the same S-GAL/G-ACH(RESV) packet sent by the source LER-A at 268. With respect to the meaning of the 272 "re-generate," this can be, but is not necessarily, a re-encapsulating of the REVS or functional equivalent control plane protocol message extracted at 270.

Next, at 274, when the next node receives the S-GAL/G-ACH(RESV) packet forwarded at 272, subsequent operations according to flow 200B can depend on whether that next node is the destination, i.e., the destination LER-B, or another transit node. If the next node at 274 is another transit LSR, the operations according to the flow 200B can return to 270, and perform blocks 270, 272, and 274 until the answer at 274 is "YES," in other words when the S-GAL/G-ACH(RESV) packet has reached the destination LER-B.

Referring to FIG. 2B, in example operations according to the flow 200B, after the S-GAL/G-ACH(RESV) packet reaches the destination LER-B at 274, that LER-B can, at 276, detect the S-GAL/G-ACH(RESV) packet, extract the LSP Label, and program the cross-connect in its H/W. Then, at 278, the reverse tunnel of the BDA tunnel being provisioned by in-band control plane operations according to flows 200A and 200B of FIGS. 2A and 2B, respectively, is provisioned. The provisioning of a BDA tunnel between source LER-A and destination LER-B is therefore complete at 278.

With respect to example structures for the S-GAL/G-ACH (TNL_CNTL) packets, one or more exemplary embodiments can provide the structure as an extension of the IETF MPLS Working Group draft standard 'MPLS Generic Associated Channel (G-ACH) Advertisement Protocol' (GAP), which includes certain procedures for encoding application specific information to be exchanged by LSRs. As previously identified in this disclosure, the G-ACH header and the GAP protocol are known, or readily referenced, by persons of ordinary skill and, therefore, reproduction in this disclosure is not necessary for such persons to practice in accordance with the described embodiments. Known conventional GAP protocol can carry application specific information over the G-ACH channel of a Tunnel, Pseudo-wire or a Section from end-point to the other. The GAP protocol uses a message format which consists of a fixed header followed by a GAP payload, which contains one or more application level data block elements (ALDBE). An ALDBE contains an application identifier (AID), a lifetime and zero or more TLV objects to describe application specific information.

For purposes of consistency in referencing examples in this disclosure, one aspect of extensions of the GAP protocol in accordance with various exemplary embodiments is named herein as the "Tunnel Association State Condition protocol" or "TASC protocol." It will be understood that "Tunnel Association State Condition" and its acronym "TASC" are arbitrary names that are applied in this disclosure for consistent referencing in describing example operations and, as such, impose no limitation on the scope of practices according to various exemplary embodiments, or the naming schemes chosen for such practices.

Figure 3A:
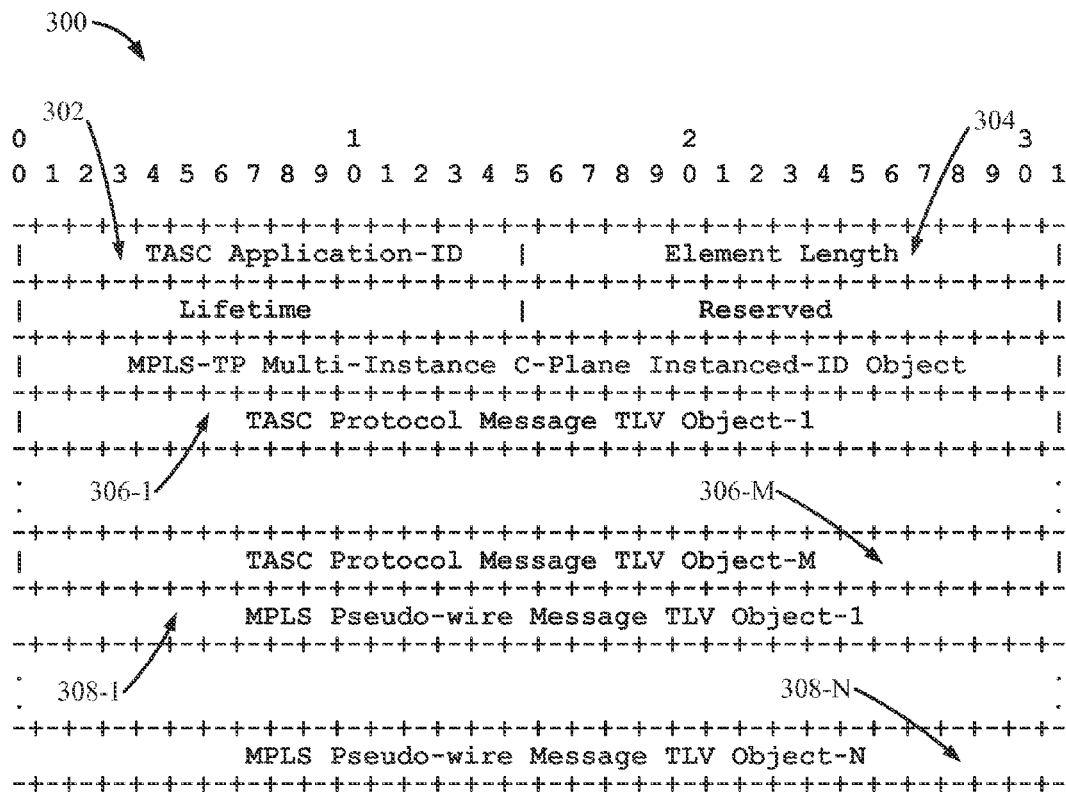
FIG. 3A shows one example extended GAL structure for encapsulating and in-plane exchange of tunnel control messages in accordance with one or more exemplary embodiments.

FIG. 3A shows one example extended GAL ALDBE structure 300 for in-plane tunnel control messaging in accordance with one or more exemplary embodiments.

Referring to FIG. 3A, the extended GAL ALDBE structure 300 can include a TASC Application-ID 302 that identifies TASC as a MPLS-TP GAP messaging application. The bit length of the TASC Application-ID 302 can be, for example, 16 bits. One illustrative binary value for the TASC Application-ID 302 is binary 2. The extended GAL ALDBE structure 300 can include an Element Length 304 indicating the total length of this extended GAL ALDBE structure 300, including the Application ID and the Element Length fields. The bit length of the Element Length 304 can be, for example, 16 bits. The extended GAL ALDBE structure 300 can further include a Version field (not explicitly visible in FIG. 3A), identifying a TASC protocol version number. The bit length of the Version can be, for example, 4 bits.

With continuing reference to FIG. 3A, the extended GAL ALDBE structure 300 can include a plurality of M TASC Protocol Message TLV Objects 306-1 through 306-M. For purposes of describing features, the TASC Protocol Message Objects 306-1 through 306-M are alternatively referenced, collectively, as "TASC Protocol Message TLV Objects 306" and, generically, as "a TASC Protocol Message TLV Object 306."

Figure 3B:
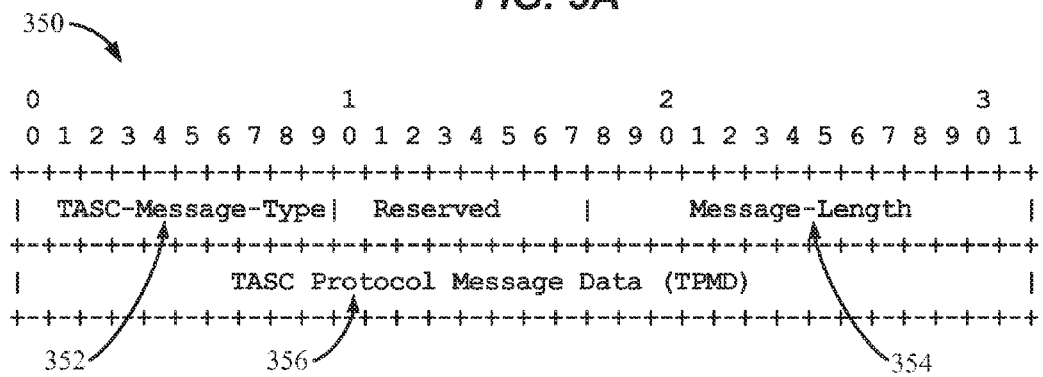
FIG. 3B shows one example structure for one Tunnel Association State Condition (TASC) Protocol Message TLV Object within the FIG. 3A example extended GAL structure.

FIG. 3B shows one example structure 350 that can be used for the TASC Protocol Message TLV Objects 306. Referring to FIG. 3B, structure 350 for the TASC Protocol Message TLV Objects 306 can include a TASC-Message-Type 352 identifying a tunnel control message type that can be selectable among a plurality of given tunnel control message types. The bit length of the TASC-Message-Type 352 can be, for example, 8 bits. Using the example 8-bit field length, the TASC-Message-Type 352 can support, i.e., be selectable among, 256 different tunnel control message types. Examples, shown in Table II, can include, but are not limited to

TABLE II

EXAMPLE TASC-MESSAGE-TYPES

Create a Tunnel Association
Delete a Tunnel Association
Administrative Disabling of Tunnel Association
Administrative Enabling of Tunnel Association
Signal Failure
Association No Fault Referring to FIG. 3B, structure 350 for the TASC Protocol Message TLV Objects 306 can further include a Message-Length 354 indicating the total length of this of the TASC Protocol Message TLV Object, including Message-Type 352 and Message-Length 354 fields.

The FIG. 3B structure 350 for the TASC Protocol Message TLV Objects 306 can further include a TASC Protocol Message Data 356, which may have a variable bit length, for example, depending on the TASC-Message-Type 352.

In an aspect, the TASC Protocol Message Data can contain or convey MPLS-TP Tunnel Identification information based, for example, on the IETF standard RFC6370. Further to this aspect, the MPLS-TP Tunnel Identification information may include a forward LSP identification and a reverse LSP identification for end-point nodes to exchange in provisioning a BDA tunnel. Related to this aspect, the forward LSP identification and the reverse LSP identification may each include a pair of N-tuples.

In an aspect, the above-described N-tuples can be formed by exchange of association request and response messages, either as IP encapsulated or non-IP encapsulated packets, over the G-ACH of the LSPs.

Based on this information carried by the TASC Protocol Message Data, forward and reverse LSP pairs of an Associated Tunnel can be identified at each end-point, as described in greater detail at later sections of this disclosure. In an aspect, the TASC Protocol Message Data can include Forward LSP Identification Information (not specifically visible in FIG. 3B) and Reverse LSP Identification Information (not specifically visible in FIG. 3B).

Examples of Forward LSP Identification Information are shown in Table III, but are not limited by Table III.

TABLE III

EXAMPLES OF FORWARD LSP ID INFORMATION

Source-Global-ID, Source-Node-ID,
Source-Tunnel-Number, Source-LSP-Number

TABLE III-continued

EXAMPLES OF FORWARD LSP ID INFORMATION

Destination-Global-ID, Destination-Node-ID,
Destination-Tunnel-Number, Destination-LSP-Number Examples of Reverse LSP Identification Information are shown in Table IV, but are not limited by Table IV.

TABLE IV

EXAMPLES of REVERSE LSP ID Information

Destination-Global-ID, Destination-Node-ID,
Destination-Tunnel-Number, Destination-LSP-Number
Source-Global-ID, Source-Node-ID, Source-Tunnel-Number,
Source-LSP-Number In an aspect, the TASC Protocol Message Data can include Forward LSP Out-bound Label (not specifically visible in FIG. 3B) and Reverse LSP In-bound Label (not specifically visible in FIG. 3B).

Referring to FIG. 3A, the extended GAL ALDBE structure 300 can include a plurality of N MPLS Pseudo-Wire Message TLV Objects 308-1 through 308-N. For purposes of describing features, the N MPLS Pseudo-Wire Message TLV Objects 308-1 through 308-N are alternatively referenced, collectively, as "MPLS Protocol Pseudo-Wire Message TLV Objects 308" and, generically, as "an MPLS Protocol Pseudo-Wire Message TLV Object 308."

Figure 3C:
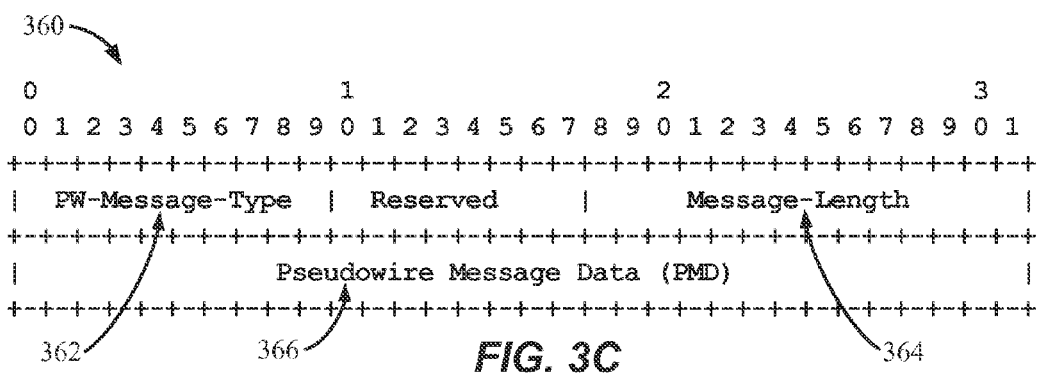
FIG. 3C shows one example structure for one TASC Protocol Pseudo-Wire Message TLV Object within the FIG. 3A example extended GAL structure.

FIG. 3C shows one example structure 360 for the MPLS Protocol Pseudo-Wire Message TLV Objects 308. Referring to FIG. 3C, structure 360 for the MPLS Protocol Pseudo-Wire Message TLV Objects 308 can include an SPW-Message-Type 362 which identifies a specific pseudo-wire control request or related message type. The bit length of the SPW-Message-Type 362 can be, for example, 8 bits. Assuming an 8-bit length of SPW-Message-Type 362, up to 256 different pseudo-wire control request and related message types can be supported. Examples, such as shown in Table V, can include, but are not limited to

TABLE V

EXAMPLE SPW-MESSAGE TYPES

Create a Pseudo-wire
Delete a Pseudo-wire
Administrative Disabling of Pseudo-wire
Administrative Enabling of Pseudo-wire
Signal Failure
Pseudo-wire No Fault In an aspect, the structure 360 for the MPLS Protocol Pseudo-Wire Message TLV Objects 308 can include a Message-Length 364 identifying a total length of the MPLS Protocol Pseudo-Wire Message TLV Object 308 including the SPW-Message-Type 362 and Message-Length 364 fields.

Referring to FIG. 3C, in a further aspect, the structure 360 for the MPLS Protocol Pseudo-Wire Message TLV Objects 308 can include a Pseudo-Wire Message Data 366, which may have variable bit length, for example, depending on the SPW-Message-Type 362.

In an aspect, MPLS Pseudo-Wire Message Data 366 may contain the pseudo-wire related information that an LER may send in the MPLS protocol message, where there is a VPN service provisioned over a BDA tunnel. Information carried by the MPLS Pseudo-Wire Message Data 366 may include pseudo-wire labels (not specifically visible in FIG. 3C), for example, Pseudo-wire Out-bound Label (not specifically visible in FIG. 3C), and Pseudo-wire In-bound Label (not specifically visible in FIG. 3C).

Referring to FIG. 3A, in an aspect, the extended GAL ALDBE structure 300 can include a Multi-Instance Control Plane Instance ID (shown but not separately numbered). The Multi-Instance Control Plane Instance ID is not necessary to understand concepts of, or practicing various exemplary embodiments. Further detailed description of the Multi-Instance Control Plane Instance ID is therefore omitted.

In an aspect, association setup and teardown through in-plane communication of tunnel control messages in accordance with various exemplary embodiments can be provided by single-sided control or by double-sided control. In one example single side control, the association setup and teardown requests can be triggered from one end-point, e.g., one among the FIG. 1 first end-point LER 102A and second end-point LER 102B, and the other end-point can function as a responder. In one example double-sided control, association setup and teardown requests can be independently initiated from either end-point e.g., from either among the FIG. 1 first end-point LER 102A and second end-point LER 102B. Examples of double-sided control, in an aspect, can include each end-point of a bi-directional tunnel independently validating a received request from the remote end-point, and committing Association setup or teardown locally only after seeing a valid request and response from both end points.

Figure 4:
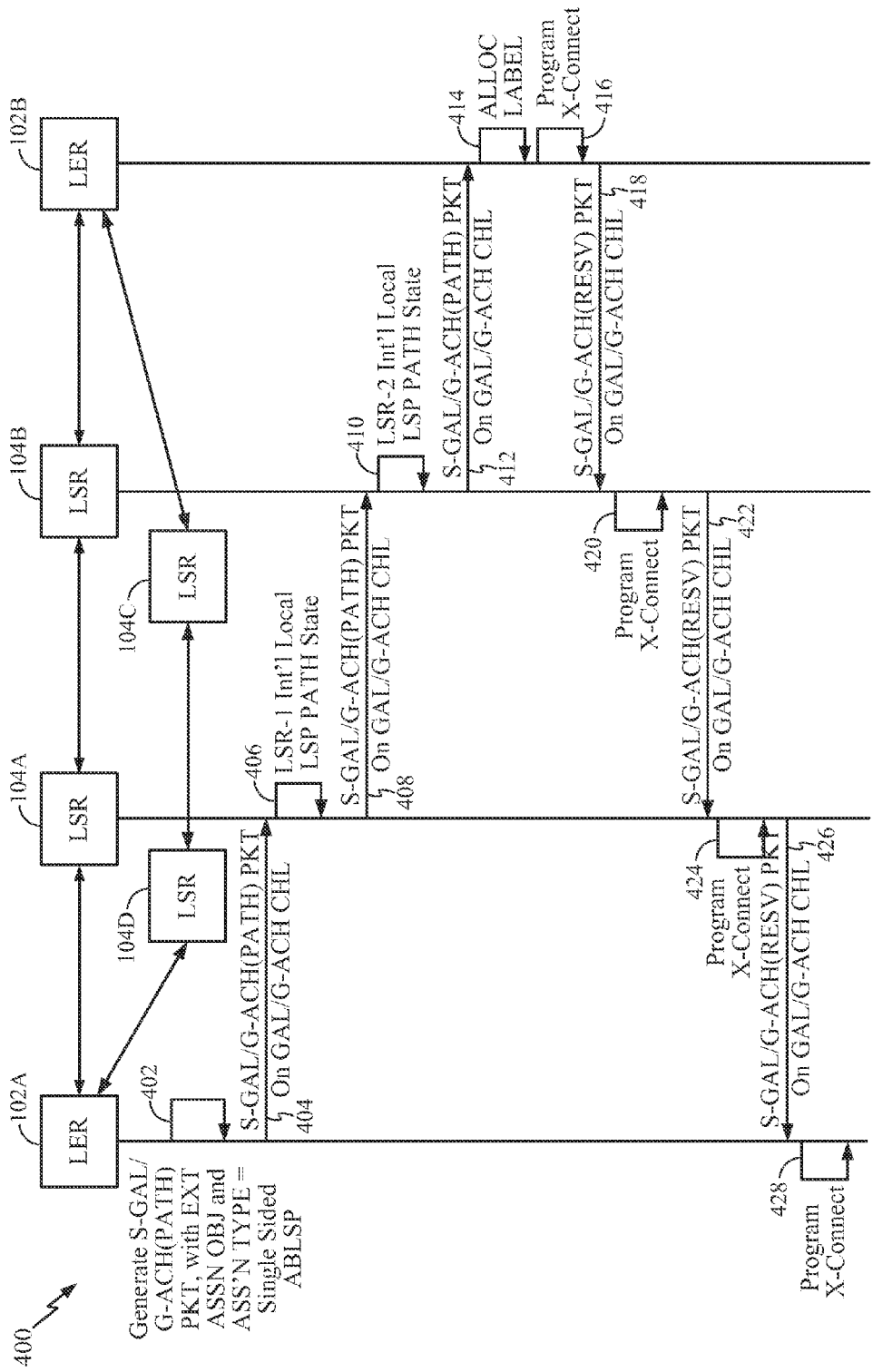
FIG. 4 shows one example signaling flow for an in-plane extended GAL protocol tunnel control messaging, for one single-sided controlled associated forward LSP set-up in a provisioning of a bi-directional associated tunnel on the FIG. 1 example MPLS-TP topology, in accordance with one or more exemplary embodiments.

FIG. 4 shows one example signaling flow 400 of operations in one in-band RSVP-TE signaled, single-sided controlled associated forward LSP set-up, in one example process of provisioning a BDA tunnel in accordance with one or more exemplary embodiments. The signaling flow is 400 is described, to avoid complexity of describing another MPLS-TP tunnel topology, relative to the FIG. 1 MPLS-TP network 100.

For internal consistency in name assignment in describing operations relating to FIG. 4, the first end-point LER 102A will be alternatively referenced as the "source LER 102A," since it was picked as the initiating node. For similar reasons, the second end-point LER 102B will be alternatively referenced as the "destination LER 102B."

Referring to FIG. 4, in one example, the source LER 102A starts an RSVP session at 402 with a Y-GAL/G-ACH(PATH) packet that, in an aspect, can be structured according to the example extended GAL ALDBE structure 300 described in reference to FIGS. 3A-3C. As illustration, the S-GAL/G-ACH(PATH) packet generated at 402 can include a TASC Protocol Message TLV Object 306 having a TASC-Message-Type 352 field populated with a value corresponding to the Table II example "Create a Tunnel Association." The S-GAL/G-ACH(PATH) packet generated at 402 can further include a FWD XTA Object and an Association Type='Single-Sided Associated Bi-directional LSPs', with the destination being the destination LER 102B. The session can be uniquely identified by the IP address of the destination LER 102B, a tunnel ID, and an extended tunnel ID which can be the IP address of the source LER 102A. Next, at 404, the S-GAL/G-ACH (PATH) packet can be forwarded through a GAL/G-ACH channel in the link 106A to the transit LSR 104A. The transit LSR 104A, upon receiving the S-GAL/G-ACH(PATH) packet forwarded at 406, can install a LSP PATH state and, at 408, can forward the S-GAL/G-ACH(PATH) packet again, through a GAL/G-ACH channel in the link 106B to the next transit LSR 104B. Upon receiving the S-GAL/G-ACH (PATH) packet, the next transit LSR 104B at 410 can install a LSP PATH state locally and, at 412, can forward the S-GAL/

G-ACH(PATH) packet through the GAL/G-ACH channel in the link 106C to the forward LSP's destination LER 102B.

With continuing reference to FIG. 4, at 414 the destination LER 102B, upon receiving the S-GAL/G-ACH(PATH) packet and extracting (not separately visible in FIG. 4) information from its PATH type message, can allocate an LSP label and then, at 416, can program the appropriate cross connect to its H/W. Associated with 416, at 418, destination LER 102B can generate (not separately visible in FIG. 4) an RESV-type message in a data-plane packet, which is named for purposes of later reference as the "S-GAL/G-ACH (RESV)" packet, and send that S-GAL/G-ACH(RESV) packet with the LSP Label upstream to the transit LSR 104B via a GAL/G-ACH channel in the link 106C. The S-GAL/G-ACH(RESV) packet can have the same extended GAL/G-ACH protocol structure as previously described for the S-GAL/G-ACH(RESV) packet generated at 402. In example operations according to the FIG. 4 flow 400, upon the second end-point LER 102B receiving the S-GAL/G-ACH(PATH) packet, the second end-point LER 102B can also start construction of the reverse LSP, described separately in reference to FIG. 5.

At 420, transit LSR 104B can program the appropriate cross connect (Label and other information) to its H/W, and, at 422, can forward the S-GAL/G-ACH(RESV) packet through the GAL/G-ACH channel in the link 106B, upstream to transit LSR 104A. Next, at 424, the transit LSR 104A can program the cross connect (Label and other information) to its H/W, and at 426 forward the S-GAL/G-ACH(RESV) packet, through GAL/G-ACH channel in the link 106A, to the source LER 102A.

The signaling flow 400 can end at 428, with the source LER 102A programming the cross connect (Label and other QoS related information) to its H/W.

As described previously in reference to the destination LER 102B receiving the S-GAL/G-ACH(PATH) forwarded by the transit LSR 104B at 412, this reception can trigger the destination LER 102B to initiate provisioning the corresponding reverse direction LSP toward source LER 102A. As previously described in this disclosure, according to the FIG. 3A structure 300, the S-GAL/G-ACH(PATH) packet can contain a FWD XTA Object (e.g., TASC Extended ASSOCIATION object) and, in accordance with the single-sided control being described, can have a TASC Association Type='Single sided Associated Bi-directional LSP.' The FWD XTA Object and TASC Association Type information can be utilized by the destination LER 102B in the setup of the reverse direction LSP. Example operations are described in reference to FIG. 5.

Figure 5:
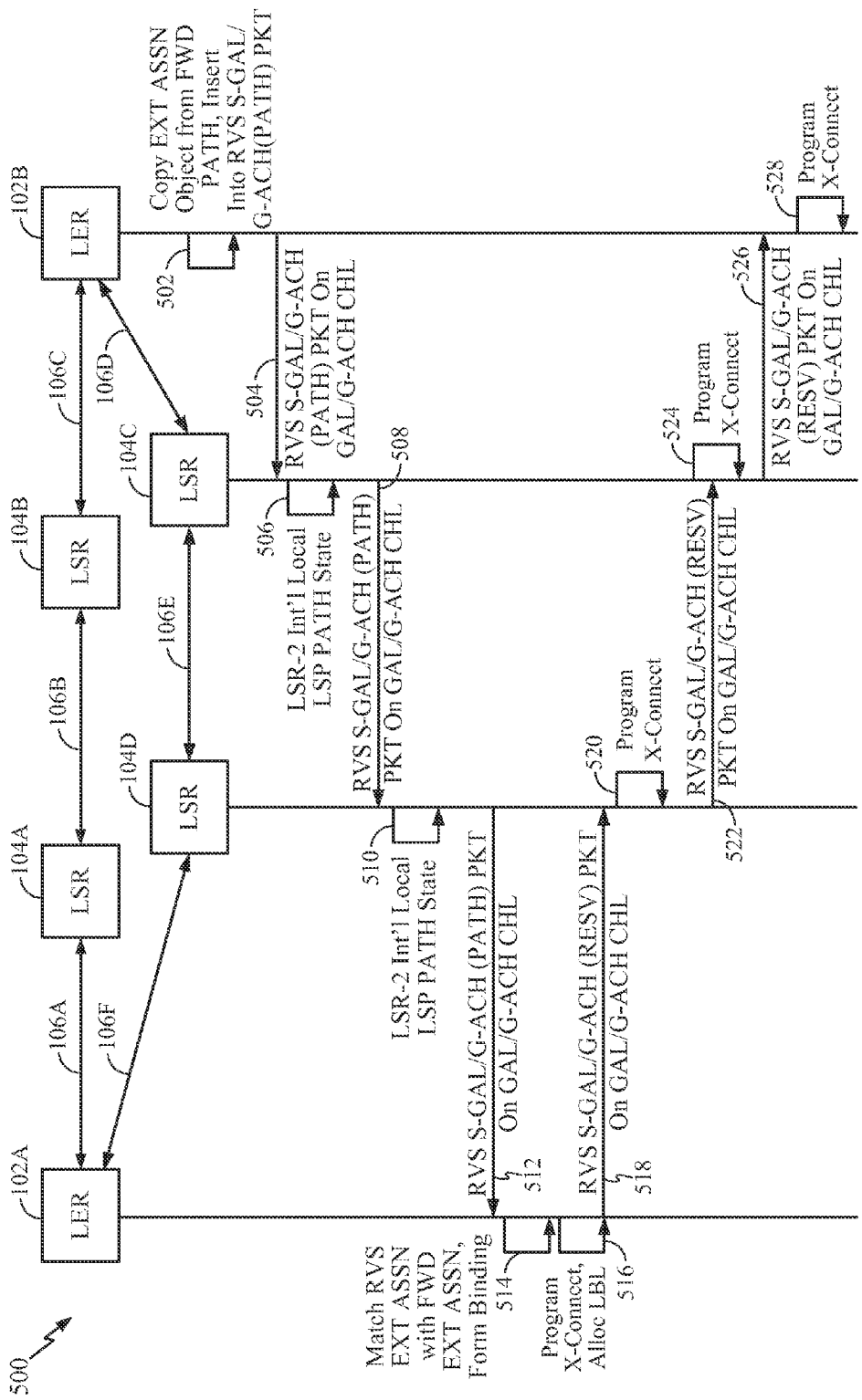
FIG. 5 shows one example signaling flow for an in-plane extended GAL protocol tunnel control messaging, for one single-sided controlled associated reverse LSP set-up in a provisioning of a bi-directional associated tunnel on the FIG. 1 example MPLS-TP topology, in accordance with one or more exemplary embodiments.

FIG. 5 shows one example signaling flow 500 in one in-band RSVP-TE signaled, double-sided controlled associated forward LSP set-up, in one example process of provisioning a BDA tunnel on the FIG. 1 MPLS-TP network 100 in accordance with one or more exemplary embodiments. It is assumed, in describing example operations according to the signaling flow 500, that, referring to FIG. 4, the destination LER 102B received the S-GAL/G-ACH(RESV) packet and extracted its FWD XTA Object (TASC Extended ASSOCIATION object).

Referring to FIG. 5, in an aspect, the session for the reverse LSP can be uniquely identified by the IP address of the source LER 102A, Tunnel ID, LSP ID and the extended tunnel ID, which is the IP address of the destination LER 102B. At 502, the destination LER 102B can copy the FWD XTA Object extracted from the S-GAL/G-ACH(PATH) packet and insert the same into a reverse (RVS)S-GAL/G-ACH(PATH) packet. Next, at 504, the RVS S-GAL/G-ACH(PATH) packet can be forwarded through a GAL/G-ACH channel in the link 106D to a neighbor transit router, which in this example, is transit LSR 104C. Then, at 506, the transit LSR 104B can install a LSP PATH state and, at 508, forward the RVS S-GAL/G-ACH(PATH) packet, through a GAL/G-ACH channel in the link 106E to the next (in an upstream direction) transit router, which in this example is transit LSR 104D. Upon receiving the S-GAL/G-ACH(PATH) packet, the transit LSR 104D can install an LSP PATH state locally and, at 512, forward the RVS S-GAL/G-ACH(PATH) packet through the GAL/G-ACH channel in the link 106F to the reverse LSP destination, which is the source LER 102A.

With continuing reference to FIG. 5, at 514, the source LER 102A, upon receiving the RVS S-GAL/G-ACH(PATH) packet, can extract the FWD XTA Object and look for a match with the 'Extended Association' locally stored in the PATH state of the forward LSP formed at FIG. 4. The matching at 514 forms an Association binding of the Forward/Reverse LSP pair, resulting in a BDA Tunnel. The source LER 102A can then, at 516, allocate an LSP Label and program the cross connect to H/W. Next, at 518, the source LER 102A can send a reverse (RVS)S-GAL/G-ACH(RESV), with the LSP Label, to transit LSR 104D, over the GAL/G-ACH channel in the link 106F, for hop-by-hop GAL/G-ACH channel forwarding to destination LER 102B. In further detail, upon receiving the RVS S-GAL/G-ACH(RESV) packet, the transit LSR 104D, at 520, can program the appropriate cross connect (with the LSP Label and other information) to its H/W. Next, at 522, transit LSR 104D can forward the RVS S-GAL/G-ACH (RESV) packet to its upstream transit node, which is transit LSR 104C, through a GAL/G-ACH channel in the link 106E. The transit LSR 104C, at 524, upon receiving the RVS S-GAL/G-ACH(RESV) packet, can program the cross connect (LSP Label and other information) to its H/W and, at 526, can forward the RVS S-GAL/G-ACH(RESV) packet, through a GAL/G-ACH channel in the link 106D, to the destination LER 102B, which is the reverse LSP's source node. Lastly, at 528, the destination LER 102B can program the cross connect (LSP Label and other QoS related information) to H/W.

In an aspect, a double sided provisioning of a BDA tunnel within an MPLS-TP network can be provided by GAL/G-ACH channel exchange of tunnel control messages in accordance with one or more exemplary embodiments. In an aspect, a BDA tunnel setup can be independently initiated by two desired end-point nodes, e.g., the first end-point LER 102A and second end-point LER 102B, by exchanging RSVP-TE type signaling messages, hop-by-hop, through the GAL/G-ACH channels of a succession of MPLS-TP links connecting transit LSRs 104 between the end-points.

Figure 6:
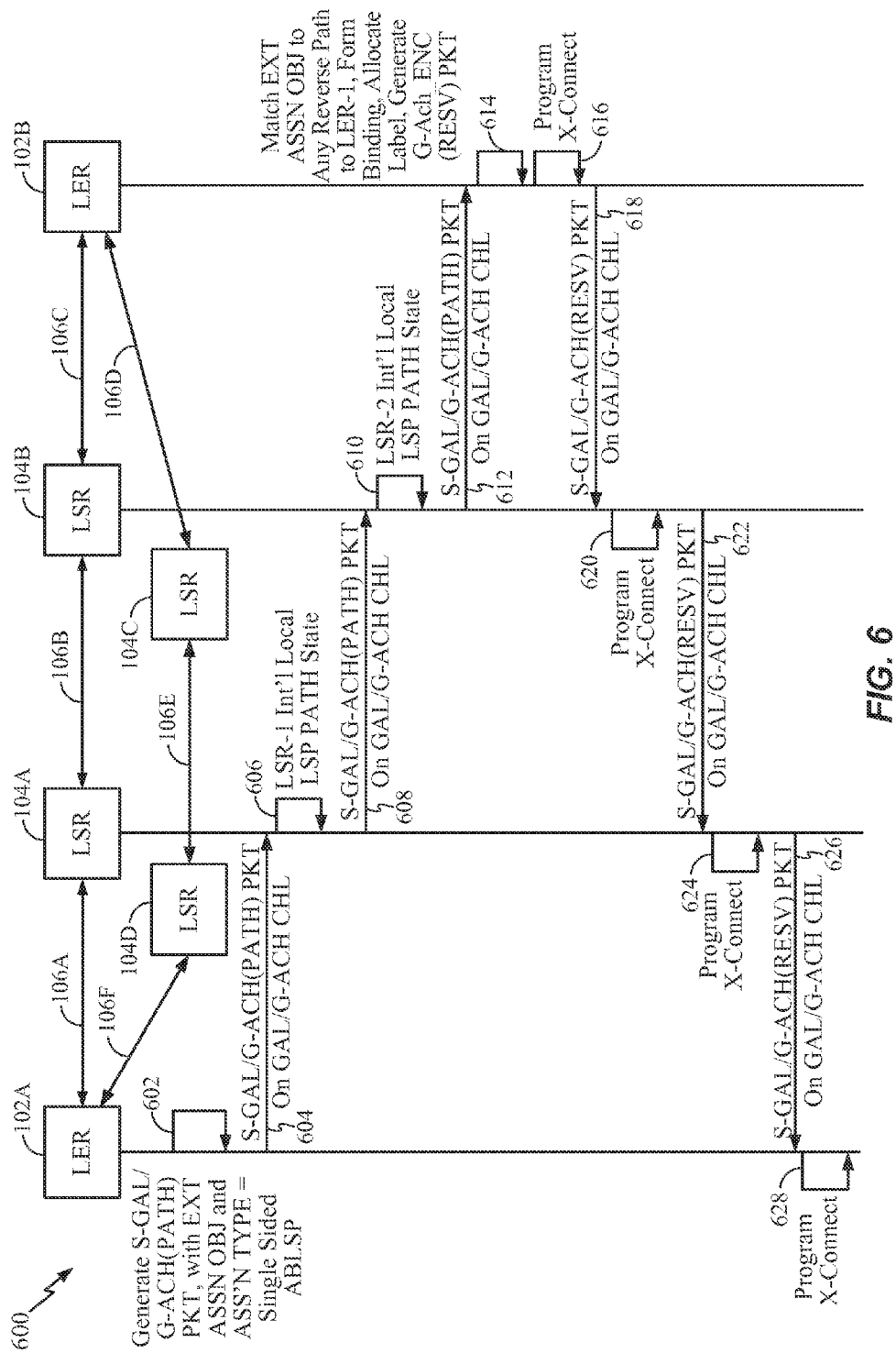
FIG. 6 shows one example signaling flow for an in-plane extended GAL protocol tunnel control messaging, for one double-sided controlled associated forward LSP set-up in a provisioning of a bi-directional associated tunnel on the FIG. 1 example MPLS-TP topology, in accordance with one or more exemplary embodiments.

FIG. 6 shows one example signaling flow 600 of operations in one GAL/G-ACH channel, RSVP-TE signaled, double-sided controlled associated forward LSP set-up, in one provisioning of a BDA tunnel on the FIG. 1 MPLS-TP network 100 in accordance with one or more exemplary embodiments.

Referring to FIG. 6, operations can begin at 602 with source LER 102A starting an RSVP session by generating a PATH-type message encapsulated in an S-GAL/G-ACH (PATH) packet in accordance with one or more exemplary embodiments. In an aspect, the S-GAL/G-ACH(PATH) packet can be structured according to the example described in reference to FIGS. 3A-3C. As one illustration, the S-GAL/G-ACH(PATH) packet generated at 602 configure to contain an FWD XTA Object and an Association Type='Double sided Associated Bi-directional LSPs', with the destination being the destination LER 102B. The session can be uniquely identified by the IP address of the destination LER 102B, the tunnel ID and the extended tunnel ID, which can be the IP address of the source LER 102A. The S-GAL/G-ACH (PATH) packet can be forwarded at 604 through a GAL/G-ACH channel in the link 106A to the transit LSR 104A. At 606 the transit LSR 104A can install an LSP PATH state and, at 608, can forward the S-GAL/G-ACH(PATH) packet to the next transit LSR 104B, through a GAL/G-ACH channel in the link 106B. Then, at 610, transit 104B installs a LSP PATH state and 612 forwards the S-GAL/G-ACH(PATH) packet, through a GAL/G-ACH channel in the link 106C, to the destination LER 102B.

With continuing reference to FIG. 6, after receiving the S-GAL/G-ACH(PATH) packet forwarded to it at 612, the destination LER 102B can, at 614, identify and determine if that packet's FWD XTA Object matches the same in the destination LER 102B's local PATH state of any reverse direction LSP (i.e., LSP destined to the source LER 102A). If there is a match, the destination LER 102B can form an association binding of the Forward/Reverse LSP pair, which establishes a BDA tunnel. If there is no match, the destination LER 102B can drop, i.e., not respond to the S-GAL/G-ACH (PATH) packet. Assuming a match is found at 614, the destination LER 102B at 616 can allocate an LSP Label, program the appropriate cross connect to its H/W and, at 618, send a S-GAL/G-ACH(RESV) packet with the LSP Label upstream (relative to the forward LSP to its neighboring transit LSR 104B. The sending at 618 of the S-GAL/G-ACH(RESV) packet is through a GAL/G-ACH channel in the link 106C. Next, at 620, transit LSR 104B can program the appropriate cross connect (LSP Label and other information) to its H/W and, at 622, forward the S-GAL/G-ACH(RESV) packet to transit LSR 104A, which is the next upstream neighbor transit LSR, through a GAL/G-ACH channel in the link 106B. Next, at 624, upon receiving the S-GAL/G-ACH(RESV) packet, transit LSR 104A can program the appropriate cross connect (LSP Label and other information) to its H/W and, at 626, forward S-GAL/G-ACH(RESV) packet to the source LER 102A, through the GAL/G-ACH channel in the link 106A. Lastly, at 628, the source LER 102A can program the appropriate cross connect (LSP Label and other QoS related information) to its H/W, thereby establishing a BDA tunnel between LERs 102.

Figure 7:
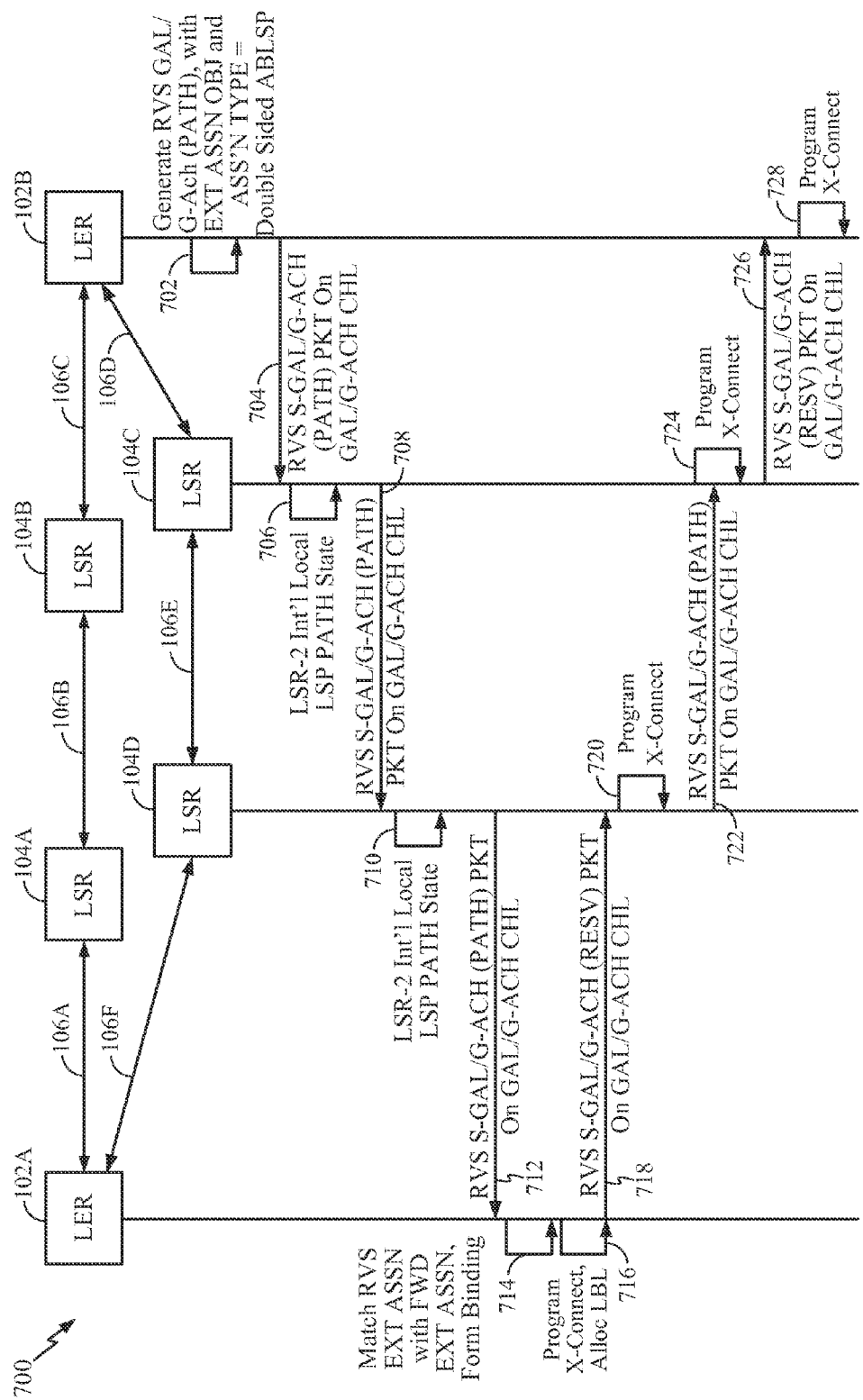
FIG. 7 shows one example signaling flow for an in-plane extended GAL protocol tunnel control messaging, for one double-sided controlled associated reverse LSP set-up in a provisioning of a bi-directional associated tunnel on the FIG. 1 example MPLS-TP topology, in accordance with one or more exemplary embodiments.

FIG. 7 shows one example signaling flow 700 of operations in one GAL/G-ACH channel, RSVP-TE signaled, double-sided controlled, associated forward LSP set-up, in one process of provisioning a BDA tunnel on the FIG. 1 MPLS-TP network 100 in accordance with one or more exemplary embodiments. Example operations according to the signaling flow 700 are described assuming the forward LSP from the first end-point LER 102A to the second end-point LER 102B has been setup, for example, by the FIG. 6 flow 600.

Referring to FIG. 7, in one example of operations according to the flow 700, the second end-point LER 102B, now a "source" LER 102B can start, at 702, a RSVP session with a PATH type message encapsulated in a reverse (RVS)S-GAL/G-ACH(PATH) packet. The RVS S-GAL/G-ACH(PATH) packet contains a reverse (RVS) XTA Object and Association Type='Double sided Associated Bi-directional LSPs', and identifies the first LER 102A as destination LER 102A. The RSVP session initiated at 702 can be uniquely identified by the IP address of the destination LER 102A, tunnel ID and extended tunnel ID which is the IP address of the source LER 102B. Next, at 704, the RVS S-GAL/G-ACH(PATH) packet is forwarded, though the GAL/G-ACH channel in the link 106D, to the transit LSR 104C. At 706, transit LSR 104C installs an LSP PATH state and 708 forwards the RVS S-GAL/G-ACH(PATH) packet, through the GAL/G-ACH channel in the link 106E, to the next transit LSR 104D. At 710, the transit LSR 104D—installs an LSP PATH state and at 712 forwards the RVS S-GAL/G-ACH(PATH) packet, through the GAL/G-ACH channel in the link 106F, to the reverse LSP's destination LER 102A. The destination LER 102A identifies and matches at 814 the RVS XTA Object received in the RVS S-GAL/G-ACH(PATH) packet against the same in the local PATH state of any forward direction LSP (i.e., in this example, the LSP destined to the second LER 102B) to form an Association binding of the Forward/Reverse LSP pair, resulting in a BDA Tunnel.

With continuing reference to FIG. 7, in one example of operations according to the flow 700, the destination LER 102A, at 716, can allocate an LSP Label and program the cross connect to its H/W. Next, at 718, LER 102A can send an S-GAL/G-ACH(RESV) packet with the LSP Label to transit LSR 104D, through a GAL/G-ACH channel in the link 106F. At 730, transit LSR 104D, upon receiving the S-GAL/G-ACH(RESV) packet, can program the cross connect (LSP Label and other information) to its H/W and, at 722, can forward the S-GAL/G-ACH(RESV) packet to its next upstream (relative to the direction of the reverse LSP) transit LSR 104C, through a GAL/G-ACH channel in the link 106E. Next, at 724, transit LSR 104C, upon receiving the S-GAL/G-ACH(RESV) packet, can program the cross connect (LSP Label and other information) to H/W and, at 726, can forward the S-GAL/G-ACH(RESV) packet to the second end-point (now "source") LER 102B, i.e., which is the head-end of the reverse LSP, through a GAL/G-ACH channel in the link 106D. Lastly, at 728, the second LER end-point 102B can program the cross connect (LSP Label and other QoS related information) to H/W.

In an aspect, a MPLS-TP BDA tunnel can be removed using in-band RSVP-TE signaling exchange methods and systems in accordance with various exemplary embodiments. In one aspect, RSVP-TE type teardown messages can be carried over the GAL/G-ACH channel of a MPLS-TP Link (GAL=13) or the G-ACH channel of tunnel between two end-points. In one aspect, a BDA tunnel can be deleted via in-band RSVP-TE type messages, initiated by a single-side de-provisioning from a head-end node, for example, whichever of the FIG. 1 LERs 102 is designated as the "head-end." In another aspect, a BDA tunnel can be deleted via in-band RSVP-TE type messages (e.g., "Path-Tear" type messages) communicated in a double-sided de-provisioning process, from each end-point node (i.e., first end-point LER 102A and second end-point LER 102B) independently.

In an aspect, an RSVP-TE Path-Tear message, or operationally equivalent message that may be identified by a person of ordinary skill upon view of the present disclosure, can be encapsulated in an extended GAL structure packet, and sent to follow, hop-by-hop, through the G-ACH channel of the GAL label over the MPLS-TP link(s). For purposes of description, an example extended GAL encapsulating packet, carrying an RSVP-TE Path-Tear message, or an operational equivalent, is named "S-GAL/G-ACH(Path-Tear) packet." In one aspect, X-GAL/G-ACH(Path-Tear) packet can be provided with a TTL value of 1, thereby causing interception by every intermediating node.

It will be understood that "X-GAL/G-ACH(Path-Tear) is only an arbitrary name applied in this disclosure for consistent referencing in describing example operations, and imposes no limitation on the scope of practices according to various exemplary embodiments. It will be understood, instead, that in practices according to the various exemplary embodiments, naming schemes can be a design choice.

Figure 8:
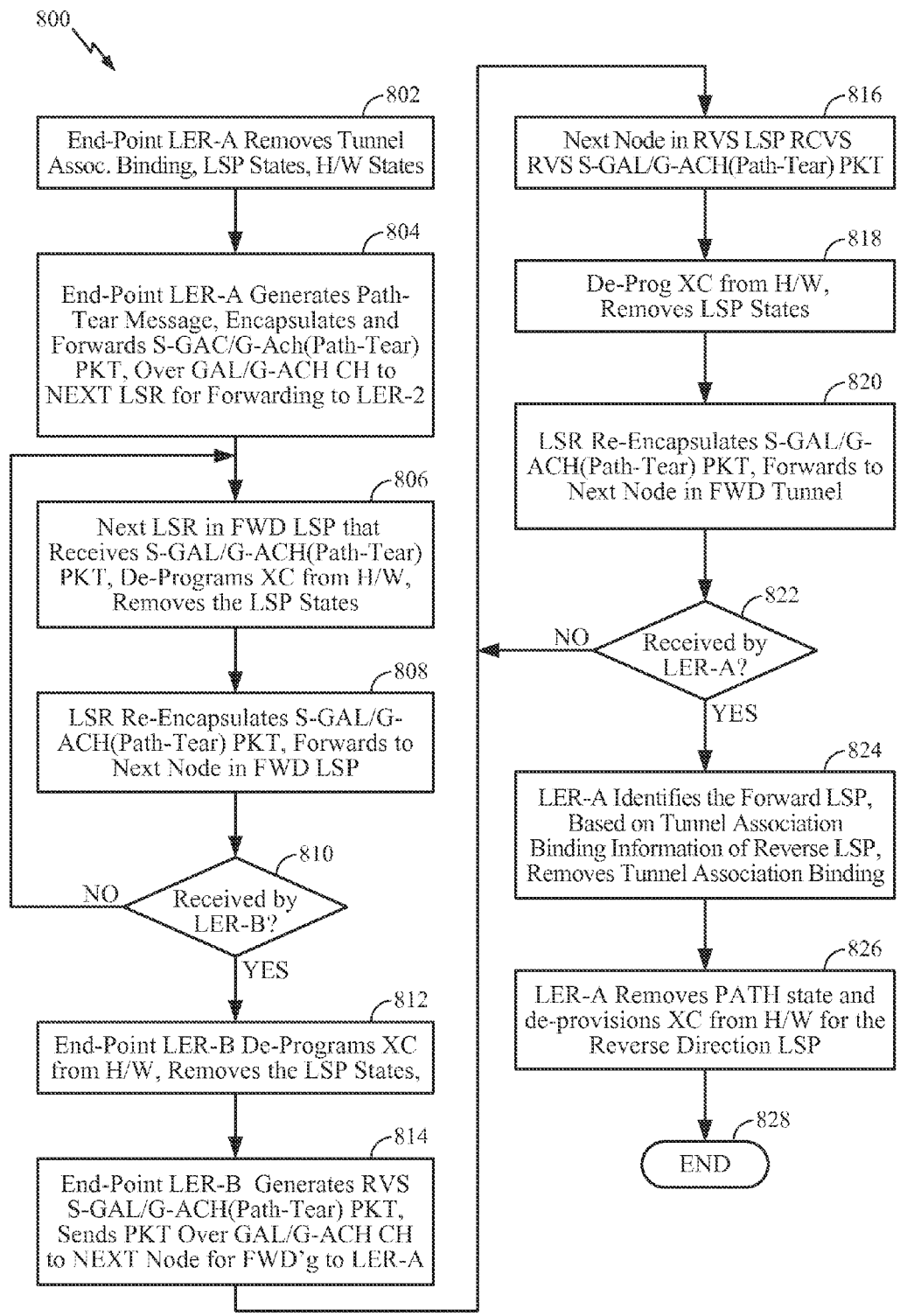
FIG. 8 shows one example high-level functional flow 800 of operations in one in-band RSVP-TE signaled, single-sided teardown, or de-provisioning of a bi-directional associated tunnel in accordance with one or more exemplary embodiments.

FIG. 8 shows one example high-level functional flow 800 of operations in-band RSVP-TE signaled, single-sided teardown, or de-provisioning of a BDA tunnel in accordance with one or more exemplary embodiments. Example operations according to the signaling flow 800 are described relative to the FIG. 1 MPLS-TP network 100 to avoid complexity of describing another MPLS-TP architecture.

Example operations according to the flow 800 can begin at 802, where one end-point, generically named "LER-A," removes tunnel association binding, LSP states, and H/W states for a forward LSP (meaning LER-A is the source of the LSP) of a BDA tunnel selected for teardown. Referring to FIG. 1, the first end-point LER 102A can be an example of LER-A, and the tunnel 150 of which the primary associated forward tunnel 150F is a member can be the forward LSP selected for teardown. Next, at 804, the end-point LER-A can generate a Path-Tear message, which may have functionality generally according to a Path-Tear message in a conventional RSVP-TE signaling, and encapsulate the Path-Tear message in an extended GAL packet, labeled X-GAL/G-ACH(Path-Tear) packet. Also at 804, the end-point LER-A can send the X-GAL/G-ACH(Path-Tear) packet through the GAL/G-ACH channel in the link to the neighboring first transit LSR in the forward LSP designated for teardown, for hop-by-hop forwarding to the LER-B end-point node. Referring to FIG. 1, the transit LSR 104A can be an example next transit LSR, and may receive the X-GAL/G-ACH(Path-Tear) packet through a GAL/G-GACJ channel in the link 106A. As described in greater detail in reference to blocks to 806, 808 and 810, each of the hops can include a transit LSR tearing down the segment of the forward LSP connecting to the next transit LSR or to the end-point LER-B.

Referring to FIG. 8, at 806 the transit LSR that receives the X-GAL/G-ACH(Path-Tear) packet forwarded at 804 detects it as a X-GAL/G-ACH(TNL_CNTL) packet, extracts the Path-Tear or equivalent content and, in response, can de-program the cross-connect (XC) from H/W, and remove the forward LSP from the stored LSP states. Next, at 808, the LSR can re-encapsulate the X-GAL/G-ACH(Path-Tear) packet and forward it to the next node in the forward LSP, through the extant GAL/G-ACH channel in an MPLS-TP link to that next node. Next, at 810, that next node receives the X-GAL/G-ACH(Path-Tear) packet. It can be seen from FIG. 8 that 810 is also the loop termination event for the hop-by-hop forwarding of the X-GAL/G-ACH(Path-Tear) packet toward the LER-B end-point. In greater detail, if the receiving node at 810 is another transit LSR, the flow can return to 806, perform the de-programming of the cross-connect from H/W and removal of LSP States, then repeat blocks 808 and 810 until the answer at 810 is "YES," i.e., the destination end-point LER-B (e.g., FIG. 1 second end-point LER 102B) is reached.

Referring to FIG. 8, when the hop-by-hop forwarding of X-GAL/G-ACH(Path-Tear) packet reaches the destination end-point LER-B (e.g., the FIG. 1 second end-point LER 102B), the flow can proceed to 812. At 812, the end-point LER-B can initiate a teardown of the reverse LSP, for example, by de-programming the cross-connect from its H/W and removing the reverse LSP states. The flow 800 can then proceed to 814 where the end-point LER-B can generate a RVS X-GAL/G-ACH(Path-Tear) packet, and send that packet over the GAL/G-ACH channel to a first transit LSR (where "first" means with respect to proximity to the LER-B) in the reverse LSP, for hop-by-hop forwarding through the reverse LSP to the LER-A end-point node. As described in greater detail in reference to blocks 816 though 820, each of the hops can include a transit LSR tearing down the segment of the reverse LSP connecting to the next transit LSR or to the end-point LER-A. More particularly, at 816, the next node in the reverse LSP for which teardown was initiated at 812 receives the RVS X-GAL/G-ACH(Path-Tear) packet sent at 814 and, at 818 responds by de-programming the cross-connect from its H/W and removing the LSP state associated with that reverse LSP. Referring to FIG. 1, a first instance of the "next node" at FIG. 4 item 816 can be the transit LSR 104C.

Referring to FIG. 8, after de-programming its H/W and removing the LSP states at 818, the above-described transit LSR can, at 820, re-encapsulate the RVS S-GAL/G-ACH (Path-Tear) packet and forward it to the next node in the reverse LSP, toward the destination LER-A, through the extant GAL/G-ACH channel in an MPLS-TP link to that next node. Referring to FIG. 1, a first instance of the "next node" identified at FIG. 4 block 818 can be the transit LSR 104D. Next, at 820, the next node identified at 818 receives the RVS S-GAL/G-ACH(Path-Tear) packet. It can be seen from FIG. 8 that 820 is also the loop termination event for the hop-by-hop forwarding of the RVS S-GAL/G-ACH(Path-Tear) packet toward the LER-A end-point. More specifically, if the receiving node at 820 is another transit LSR, the flow can return to 818, perform the de-programming of the cross-connect from H/W and removal of LSP States, then repeat blocks 820 and 822 until the answer at 822 is "YES," meaning the destination LER-A, e.g., the FIG. 1 first end-point LER 102A, has been reached.

With continuing reference to FIG. 8, upon the LER-A receiving the RVS S-GAL/G-ACH(Path-Tear) packet at 822, operations according to the flow 800 can proceed to 824, where the LER-A can identify the forward LSP and, based on the tunnel association binding information of Reverse LSP, remove the tunnel association relating to the reverse LSP. The LER-A can then, at 826, remove the PATH state and de-provision the cross-connects from its H/W for the reverse LSP designated at 814 for teardown. The flow 800 can then end, at 828.

In an aspect of one or more exemplary embodiments, an in-plane signaled double-side teardown can be provided, independently initiated, for example, by label edge routers at both end-points of a tunnel, e.g., by the FIG. 1 first end-point LER 102A and second end-point LER 102B at the end points of the FIG. 1 BDA tunnel 150.

In one example aspect, an in-plane signaled double-side teardown can include independently initiating, at a first end-point LER, for example, the FIG. 1 first end-point LER 102A, a forward LSP teardown. One example procedure for initiating a forward LSP teardown can include generating an extended GAL/G-ACH protocol packet encapsulating a path-tear type message, for, example, an RSVP-TE type Path-Tear message, for hop-by-hop forwarding, alongside the forward LSP, to the other end point LER-B, for example, the FIG. 1 second LER-B. The extended GAL/G-ACH protocol packet can be structured as described in reference to FIGS. 3A-3C, The hop-by-hop forwarding can be, for example, in general accordance with FIG. 8 flow 800, blocks 802 and 804, followed by the 806, 808, 810 loop until termination by a "YES" at 810.

In one relate aspect, a second end-point LER, for example, the FIG. 1 second end-point LER 102B, can independently initiate a reverse LSP teardown procedure by in-plane signaling an extended GAL/G-ACH protocol packet encapsulating a path-tear type message, for hop-by-hop forwarding, alongside the reverse LSP, to the first end-point LER, for example, the FIG. 1 first end-point LER 102A. An example of such initiating can be according to FIG. 8, flow block 814, except being performed independently, instead of being performed in response to receiving an extended GAL/G-ACH protocol packet encapsulating a path-tear type message from the first end-point LER.

In an aspect, systems and methods for in-band tunnel control messaging in accordance with various exemplary embodiments can provide in-band setup, teardown, and control of protected BDA tunnels within MPLS-TP networks.

Figure 9:
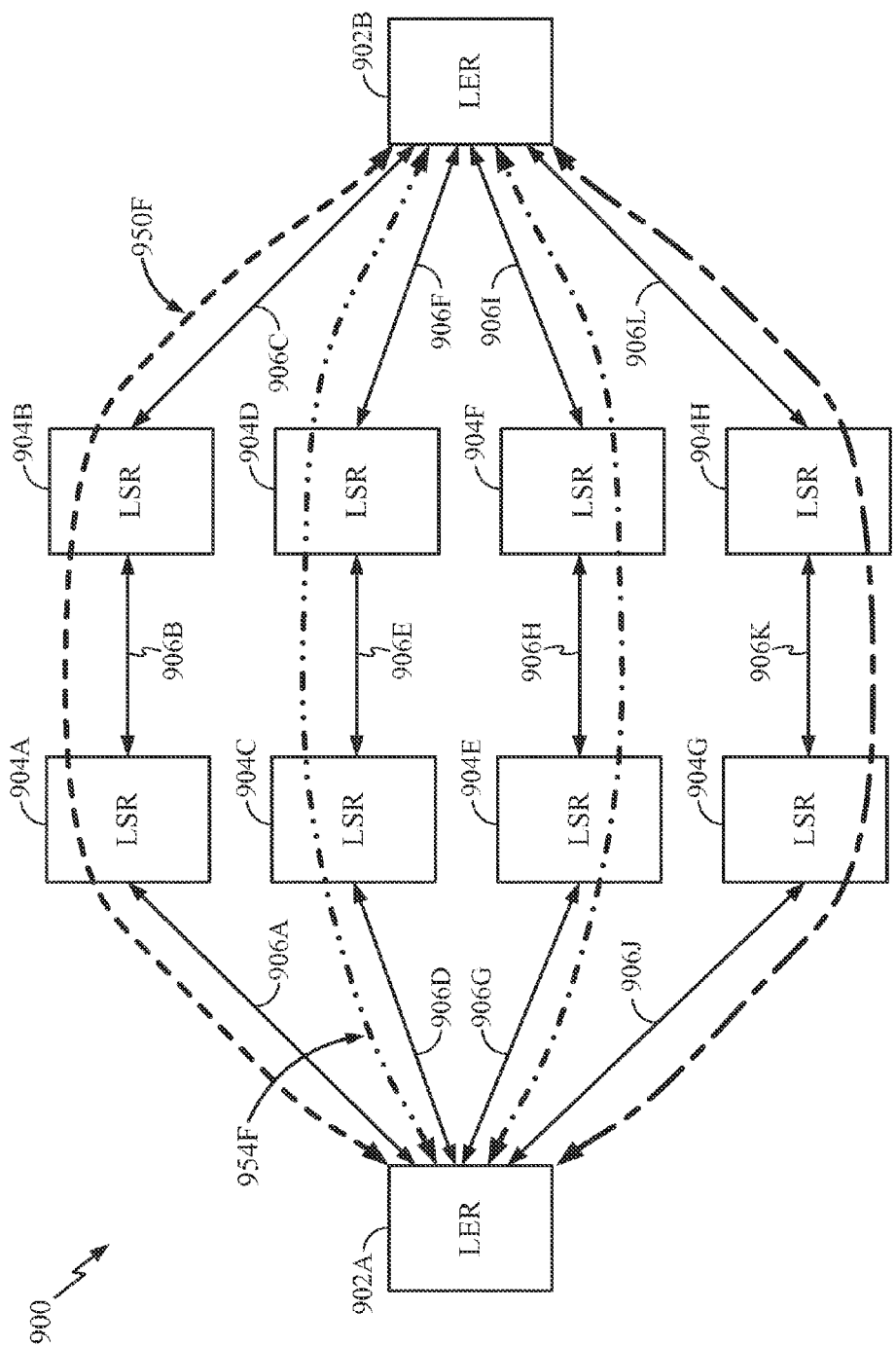
FIG. 9 shows one example signaling flow in one double-sided controlled associated reverse LSP set-up, in one process of provisioning of a bi-directional associated tunnel on the FIG. 1 example MPLS-TP topology, in one practice of in-band RSVP-TE signaling in methods and systems in accordance with one or more exemplary embodiments.

FIG. 9 shows one example topology 900 for protected BDA tunnels within one example MPLS-TP network (shown but not separately labeled). Referring to FIG. 9, the topology 900 can include a primary bi-directional associated tunnel (shown but not separately numbered) and a back-up bi-directional associated tunnel (shown but not separately numbered) extending between a first end-point LER 902A and a second end-point LER 902B. In the example topology 900, the primary bi-directional associated tunnel can include a primary forward LSP 950F and a primary reverse LSP 950R, and the secondary bi-directional associated tunnel can include a secondary forward LSP 952F and a secondary reverse LSP 952R.

General concepts and functionalities, for example, with respect to transport reliability and adaptability, of protected bi-directional associated tunnels are known to persons of ordinary skill in the art, and therefore further detailed description is omitted.

In an aspect, alternatives to various exemplary embodiments described in reference to FIGS. 2, 3A-3C, 4, 5, 6, 7, and 8 can include in-plane signaling and message exchange to provide setup and management of protected bi-directional associated tunnels such as the examples shown by FIG. 9.

One example high-level functional flow of operations of one in-band RSVP-TE signaled, single-step procedure for provisioning a BDA tunnel in accordance with one or more exemplary embodiments, will now be described relative to the FIG. 9 topology 900.

Referring to FIG. 9, one example operation can start by end-point LER 902A initiating setup of the primary forward LSP 950F to end-point LER 902B. The initiating can include the endpoint LER 902A generating an extended GAL/G-ACH protocol encapsulation packet, which may have a primary forward PATH-type message. The label can be named here, for consistent reference, as an "S-GAL/G-ACH (PFWD-PATH)" packet (not explicitly visible in FIG. 9). The S-GAL/G-ACH(PFWD-PATH) packet generated can have a structure, for example, as described in reference to FIGS. 3A-3C. One example S-GAL/G-ACH(PFWD-PATH) packet may include all, or some of the example objects and parameters shown in Table VI.

TABLE VI

S-GAL/G-ACH(PFWD-PATH) PACKET OBJECTS, PARAMETERS

Extended ASSOCIATION' object,
with Association Type = 'Single sided Associated Bi-directional LSP'.
Unique Association ID value for the primary LSP
ASSOCIATION object with Association Type = 'Recovery'
Unique Tunnel ID and LSP ID for primary LSP The flow can further include an in-plane hop-by-hop forwarding, of the S-GAL/G-ACH(PFWD-PATH) packet, from the end-point LER 902A to the end-point LER 902B, through transit LSR 904A and transit LSR 904B. The successive forwarding can pass through respective GAL/G-ACH channels in the links 906A, 906B and then 906C. In an aspect, the hops of the in-plane forwarding do not require particular reservation of a data channel for carrying the S-GAL/G-ACH (PFWD-PATH) packet, because the GAL-G-ACH channel is already extant. Actions performed by the transit LSRs 904A and 904A in response to receiving the S-GAL/G-ACH (PFWD-PATH) packet can correspond to the actions performed by the FIG. 4 transit LSRs 104A and 104B in receiving and forwarding the S-GAL/G-ACH(PATH) packet at 406 and 410, respectively.

Referring to FIG. 9, operations in the flow can further include, in association with the LER 902A initiating of a setup of the backup forward LSP 952F, a generation of an extended GAL/G-ACH protocol encapsulation packet having a backup forward PATH-type message. The encapsulated packets are collectively named here, for consistent reference, as an "S-GAL/G-ACH(BKFD-PATH)" packet (not explicitly visible in FIG. 9). The "S-GAL/G-ACH(BKFD-PATH)" packet can be generated to have a structure, for example, as described in reference to FIGS. 3A-3C.

One example S-GAL/G-ACH(PFWD-PATH) packet may include all, or some of the example objects and parameters shown in Table VII.

TABLE VII

S-GAL/G-ACH(PFWD-PATH) PACKET OBJECTS, PARAMETERS

Extended ASSOCIATION' object, with Association Type = 'Single sided Associated Bi-directional LSP'.
Unique Association ID Value different from primary LSP
ASSOCIATION object with Association Type = 'Recovery'
Same Tunnel ID as for primary LSP, but different LSP ID value The above-described example flow can further include an in-plane hop-by-hop forwarding caused of the S-GAL/G-ACH(BKFD-PATH) packet generated, from the end-point LER 902A to the end-point LER 902B, through transit LSR 904C and then transit LSR 904D. The successive forwarding can pass through respective GAL/G-ACH channels in the links 906D, 906E and then 906F. In an aspect, the hops of the in-plane forwarding do not require particular reservation of a data channel for carrying the S-GAL/G-ACH(BKFD-PATH) packet, because the GAL-G-ACH channel is already extant. Actions performed by the transit LSRs 904C and 904D in response to receiving the S-GAL/G-ACH(BKFD-PATH) packet can correspond to the actions performed by the FIG. 4 transit LSRs 104A and 104B in receiving and forwarding the S-GAL/G-ACH(PATH) packet at 406 and 410, respectively.

Referring to FIG. 9, the destination LER 902B, upon receiving the S-GAL/G-ACH(PFWD-PATH) packet in forming the forward primary LSP 950F, can trigger in-plane setup of the reverse primary LSP 950R toward LER 902A, by copying the 'Extended ASSOCIATION' object from the S-GAL/G-ACH(PFWD-PATH) into a reverse direction PATH type message, named for reference in describing further example operations as S-GAL/G-ACH(PRVS-PATH) packet (not explicitly visible in FIG. 9). Next, the S-GAL/G-ACH(PRVS-PATH) packet can be hop-by-hop forwarded from the end-point LER 902B to the end-point LER 902A, through the transit LSRs 904D and 904E, through respective GAL/G-ACH channels in the links 906I, 906H and then 906G. Actions performed by the transit LSRs 904D and 904E in response to receiving the S-GAL/G-ACH(PRVS-PATH) packet can correspond to the actions performed by the FIG. 5 transit LSRs 104B and 104A at 506 and 510, respectively, in receiving and forwarding the RVS S-GAL/G-ACH(RESV) packet.

With continuing reference to FIG. 9, the destination LER 902B, upon receiving the S-GAL/G-ACH(BKFD-PATH) packet, can trigger in-plane setup of the reverse secondary LSP 952R toward LER 902A. The in-plane setup can include copying the 'Extended ASSOCIATION' object from the S-GAL/G-ACH(BKFD-PATH) into a reverse direction PATH type message, named for reference in describing further example operations as S-GAL/G-ACH(BKRV-PATH) packet. Next, the S-GAL/G-ACH(BKRV-PATH) packet can be hop-by-hop forwarded, in-plane, from the end-point LER 902B, through the transit LSRs 904H and 904G, to the end-point LER 902A. The successive forwarding can pass through respective GAL/G-ACH channels in the links 906L, 906K and then 906J. Actions performed by the transit LSRs 904H and 904G in response to receiving the S-GAL/G-ACH (BKRV-PATH) packet can correspond to the actions performed by the FIG. 5 transit LSRs 104B and 104A at 506 and 510, respectively, in receiving and forwarding the RVS S-GAL/G-ACH(RESV) packet.

Referring to FIG. 9, after the above-described formation of the primary forward LSP 950F and primary reverse LSP 950R, operations of the LER 902A and LER 902B can identify and bind the primary Associated Tunnel. The identifying and binding and binding can be based on the contents of the 'Extended ASSOCIATION' object with the primary LSP's Association ID value, sent and received over the primary forward LSP 950F and primary reverse LSP 950R.

In an aspect, after formation of the backup forward LSP 952F and backup reverse LSP 952R, operations can further include the LER 902A and LER 902B identifying and binding the backup Associated Tunnel. The identifying and binding can be based on the contents of the 'Extended ASSOCIATION' object with the backup LSP's Association ID value, sent and received over the backup forward LSP 952F and backup reverse LSP 952R. In a relate aspect, the LER 902A can identify and bind the primary forward LSP 950F and backup forward LSP 952F into a Tunnel Protection group, based on the contents of the 'ASSOCIATION' object(s) with Association Type='Recovery.' Next, LER 902B can identify and bind the primary reverse LSP 950R and backup reverse LSP 952R into a Tunnel Protection group, based on the contents of the 'ASSOCIATION' object(s) with Association Type='Recovery'.

In an aspect, systems and methods for in-band tunnel control messaging in accordance with various exemplary embodiments can provide certain tunnel group control signaling and message exchange that can include, but is not limited to, a Tunnel Protection Group Management (TAPGM) protocol, for BDA tunnels within MPLS-TP networks. In one aspect, a Tunnel Protection Group can be a logical construct that include, for example, "N" working, i.e., primary, BDA tunnels between two end-point LERs, and a quantity less than N of protection tunnels, between the two LERs. The end-points can be named, for example, LER-1 and LER-2. In a further aspect, "N" can be 1, which can provide a 1:N Linear Protection architecture. In one aspect, BDA tunnels that are members of a Tunnel Protection Group should be the same type Associated Tunnel. In an aspect, the two end-points 1:N Linear Protection architecture BDA tunnel, i.e., LER-1 and LER-2, can inform each other, by in-plane exchange of TAPGM protocol messages, whenever a new member is added to or removed from the 1:N protection group, by exchanging TAPGM protocol messages. In one further aspect, configurations of TAPGM protocol messages and messaging can operate in a single-phased manner, i.e. when an end-point LER performs (or experiences) certain changes, TAPGM protocol messages can be generated and sent informs the remote end-point LER, without waiting for any acknowledgement or response.

Figure 10:
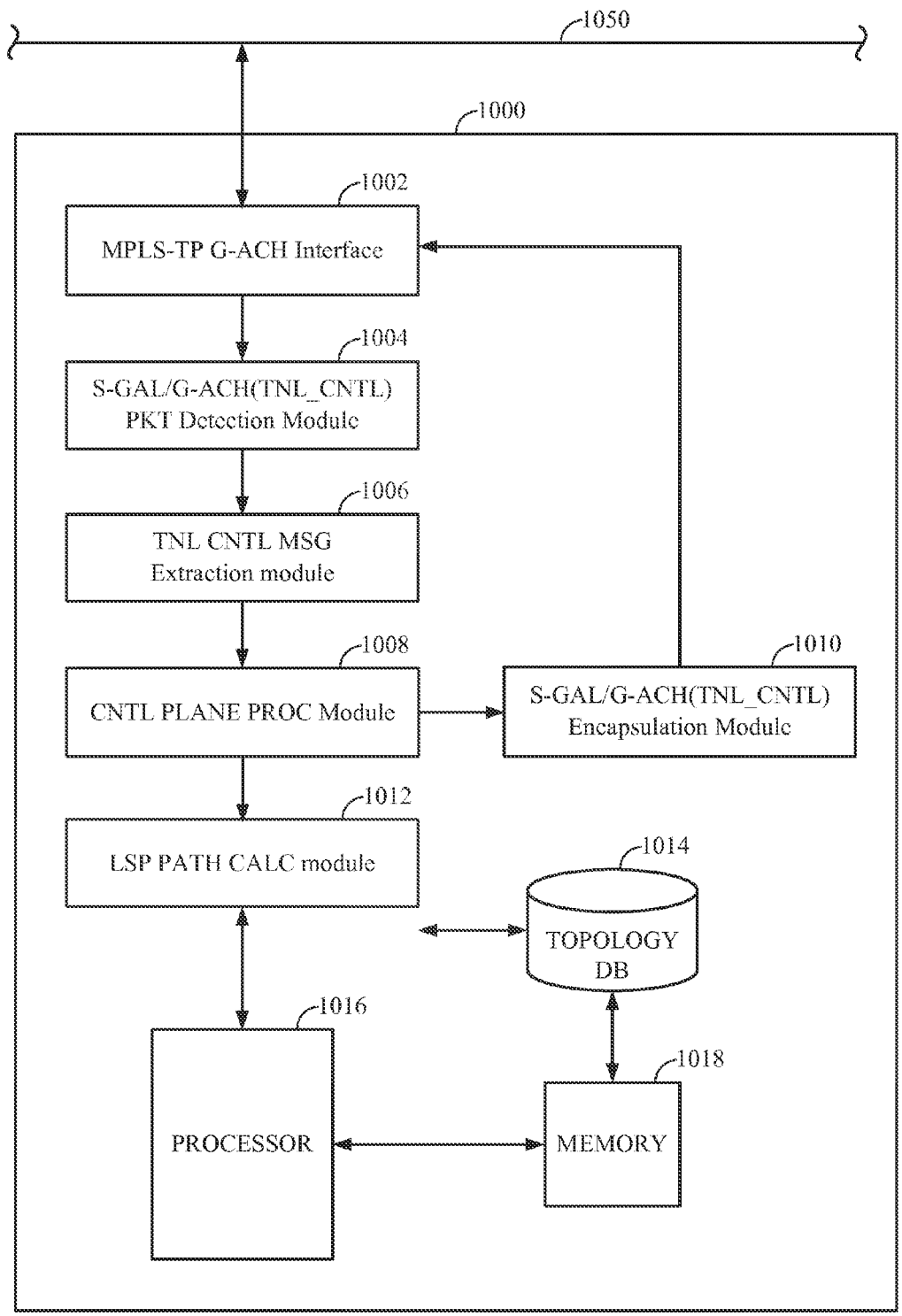
FIG. 10 shows a high-level function schematic of one LSR/LER device configured with functionalities that include dynamic provisioning and teardown, via in-band RSVP-TE signaling, of bi-directional associated tunnels in an MPLS-TP network, in accordance with one or more exemplary embodiments.

FIG. 10 shows a high-level functional schematic 1000 of one label switched router/label switched edge router (LSR/LER) device configured with MPLS-TP transport functionalities, and further configured with in-plane tunnel control messaging functionalities in accordance with one or more exemplary embodiments. For brevity, description referring to FIG. 10 uses the phrase "LSR/LER 1000" to mean resources of an LER, LSR or LER/LSR-configurable device (not specifically shown), configured, based on the present disclosure, for performing the logical functions shown in the FIG. 10 schematic 1000.

The LSR/LER 1000 can be, for example, an off-the-shelf service aggregation switch (not specifically shown in FIG. 10), such as the Ciena® 5410®, or one of various comparable devices available from other commercial vendors, having MPLS-TP functionalities and further configurable, based on the present disclosure, to perform the logical functions appearing in the FIG. 10 high-level functional schematic 1000. In an aspect, the LSR/LER 1000 can include capability to perform known, conventional MPLS-TP functionalities including installing labels, packetizing into data-plane protocol packets, popping of labels, maintaining topology databases, and calculation of explicit paths. As appreciated by persons of ordinary skill from reading the present disclosure, such MPLS-TP functionalities can be readily implemented by various off-the-shelf service aggregation switches, e.g., the Ciena® 5410® or one of various comparable devices available from other commercial vendors. In a further aspect, the LSR/LER 1000 can be configured with capability to perform known, conventional RSVP-TE signaling and processing techniques that can include, but are not limited to, known, conventional techniques for provision and tear-down of unprotected BDA tunnels in MPLS-TP networks, and known, conventional techniques for provision and tear-down of protected BDA tunnels.

Referring to FIG. 10, in an aspect, the LSR/LER 1000 can include an MPLS-TP G-ACH interface 1002 to the G-ACH (not separately shown) of, for example, one link 1050 or a plurality of links represented by the line labeled 1050. It will be understood that the link 1050, or each of a plurality of links represented by 1050, connects to a corresponding one LSR (not shown in FIG. 10) among one or more neighbor LSRs (not shown in FIG. 10). In an aspect, the LSR/LER 1000 can further include an S-GAL/G-ACH(TNL_CNTL) packet detection module 1004 configured to detect receipt at the MPLS-TP G-ACH interface 1002 of extended GAL/G-ACH protocol tunnel control messages, generically referenced herein as S-GAL/G-ACH(TNL_CNTL).

With continuing reference to FIG. 10, it will be understood that the MPLS-TP G-ACH interface 1002 and the S-GAL/G-ACH(TNL_CNTL) packet detection module 1004 are shown as separate blocks only for purposes of separating description of example aspects. As will be appreciated by persons of ordinary skill in the art from reading this disclosure, the logical functions of the MPLS-TP G-ACH interface 1002, and the S-GAL/G-ACH(TNL_CNTL) packet detection module 1004 can be merged to form a combined logical module (not separately shown in FIG. 10). As will be further appreciated by such persons, operations (not specifically shown) carrying out the above-described logical functions of the MPLS-TP G-ACH interface 1002, and the S-GAL/G-ACH (TNL_CNTL) packet detection module 1004 are not necessarily sequential in time and, instead, two or more, or all may be performed concurrently.

Continuing to refer to FIG. 10, in an aspect, the LSR/LER 1000 can include a tunnel control message extraction module 1006 configured to extract tunnel control message content (not shown in FIG. 10) from S-GAL/G-ACH(TNL_CNTL) packets detected by the S-GAL/G-ACH(TNL_CNTL) packet detection module 1004. In further aspect, the LER/LSR 1000 can include a tunnel control plane processing module 1008 configured to generate various control plane protocol tunnel setup and teardown messages based on, for example, system commands (not specifically visible in FIG. 10) and information extracted by the tunnel control message extraction module 1006. For example, referring to FIG. 2A, aspects can include the tunnel control plane processing module 1008 being configured to generate, in combination with S-GAL/G-ACH(TNL_CNTL) encapsulation module 1010, various S-GAL/G-ACH(TNL_CNTL) packets encapsulating, for example, in a data plane protocol such as described in reference to FIGS. 3A-3C, various described control plane protocol tunnel setup and teardown messages. In further aspects, the tunnel control plane processing module 1008 can, in an aspect, be further configured to perform dynamic control plane functions, such as, without limitation, install PATH states, program local cross-connects in H/W in response to RESV messages extracted from received S-GAL/G-ACH (RESV) packets, and various path tear down functions. In addition, the tunnel control plane processing module 1008 can be configured to select an appropriate G-ACH through which to forward S-GAL/G-ACH(TNL-CNTL) packets. In an aspect according to one or more exemplary embodiments, the MPLS-TP G-ACH interface 1002 may be configured to extract that identity, i.e., of the specific neighboring LSR to which to forward the S-GAL/G-ACH(TNL_CNTL) packet it receives from the S-GAL/G-ACH(TNL_CNTL) packet module 1008.

Referring to FIG. 1000, for providing MPLS-TP label edge router functionality in accordance with various embodiments, the LSR/LER 1000 can further include an LSP path calculation module 1012, for calculating a content for a path request. The LSR/LER device 1000 can further comprise network topology database 1014 having information sufficient for the LSP path calculation module 1012, to calculate a multi-hop path from the LSR/LER 1000 to a desired LER (not shown in FIG. 10). The network topology database 1014 can be constructed and updated based on the LSR/LER 1000 receiving topology message packets (not separately described in the present disclosure, from neighboring LSRs, and forwarded to an "ingress LER" from the neighboring LSRs. The LSP path calculation module 1012 can be configured with capability of computing explicit paths, according to conventional MPLS-TP path computation techniques, for example constrained shortest path first (CSPF) application techniques.

The LSR/LER 1000 may include a processor 1018 that may be a hardware device, arrangement of hardware devices (not specifically shown in FIG. 10), or an allocated or otherwise available portion of processing resources provided by such a hardware device or arrangement of hardware device, or for executing software instructions stored in a memory 1020. It will be understood that processor 1018 may be, or may be an allocated or otherwise available portion of processing resources provided by, one or more custom-designed, application-specific integrated circuit (ASIC) devices, or one or more commercially available processors, or both. It will be understood that processor 1018 may be a central processing unit (CPU), or may be one or more processing cores of a higher level CPU (not separately shown in FIG. 10). It will also be understood that the processor 1018 may be an allocated or otherwise available portion of a shared processing resource (not separately shown in FIG. 10).

In an aspect, the processor 1018 can be configured to execute software instructions stored within memory 1020 to perform computations and accesses of the memory 1020 that embody, and/or control other hardware (not specifically shown in FIG. 10) to provide, the described functionalities of the tunnel control message extraction module 1006, the MPLS-TP G-ACH interface 1002, the tunnel control plane processing module 1008, the S-GAL/G-ACH(TNL_CNTL) packet encapsulation module 1010, LSP path calculation module 1012, and network topology database 1014

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To illustrate interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action, The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. The terms "disk" and "disc," as used herein, include compact disc (CD), laser disc, optical disc, digital versatile disc (DVD), floppy disk and Blu-ray disc that store and reproduce data magnetically, and or that reproduce data optically with, for example, lasers. Combinations of the above should also be included within the scope of computer-readable media.

In addition, any disclosed connection or coupling can embody a computer-readable medium. For example, if software is described as transmitted from a website, server, or other remote source using, for example, a coaxial cable, fiber optic cable, twisted pair, or digital subscriber line (DSL), then the coaxial cable, fiber optic cable, twisted pair, DSL, or wireless technologies can be within the definition of computer readable medium that applies in this disclosure. Likewise, if software is described as transmitted from a website, server, or other remote source using, for example, a wireless technology such as infrared, microwave or other radio, then the infrared, microwave or other radio can be within the definition of computer-readable medium that applies in this disclosure.

While the foregoing disclosure shows illustrative embodiments that may be used to provide fast port recovery virtual switching, those skilled in the pertinent art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

What is claimed is:

1. A method for provisioning a bi-directional associated tunnel in a multi-protocol label switching transport protocol (MPLS-TP) network of nodes, comprising:
    dynamic provisioning a forward tunnel in a data plane from a source node to a destination node, wherein the dynamic provisioning includes in-band messaging of a forward tunnel dynamic control message, structured with a dynamic control plane protocol and having an Extended Association Object, through a forward data channel, in the data plane, between the source node and the destination node;
    receiving and processing the forward tunnel dynamic control message at one or more intermediate nodes, wherein the processing comprises installing a local path state to the destination node at each of the one or more intermediate nodes and re-generating a substantial replica of the forward tunnel dynamic control message to forward towards the destination node; and
    provisioning a reverse tunnel from the source node to the destination node, wherein the provisioning includes in-band messaging of a reverse tunnel dynamic control message, having a field for a copy of the Extended Association Object, through a given reverse data channel in a between the destination node and the source node;
    wherein the re-generating a substantial replica of the forward tunnel dynamic control message to forward towards the destination node comprises forwarding at the one or more intermediate nodes the substantial replica through a Generic Associated Label (GAL) Generic Associated Channel (G-ACH) channel in an MPLS-TP link to a next downstream node identified by an extracted Explicit Route Object (ERO).

2. The method of claim 1, wherein the forward data channel is according to a data plane protocol and wherein the in-band messaging includes encapsulating the forward tunnel dynamic control message in a forward data packet structured with the data plane protocol and forwarding the forward data packet to the destination node through the forward data channel.

3. The method of claim 2, wherein provisioning the reverse tunnel includes:
    receiving the forward data packet at the destination node,
    extracting the Extended Association Object from the forward data packet,
    generating the reverse tunnel dynamic control message at the destination node, wherein the generating includes copying the Extended Association Object into the field for a copy of the Extended Association Object, and
    encapsulating the reverse tunnel dynamic control message in a reverse data packet structured with the data plane protocol and forwarding the reverse data packet to the source node through a reverse data channel in the data plane.

4. The method of claim 3, wherein provisioning the reverse tunnel further includes a binding at the destination node of the reverse tunnel to the forward tunnel based, at least in part, on the Extended Association Object.

5. The method of claim 4, wherein dynamic provisioning a forward tunnel further includes storing, at the source node, a copy of the Extended Association Object, and wherein the method further comprises a conditional binding, at the source node, of the forward tunnel to the reverse tunnel, wherein the conditional binding includes the source node receiving the reverse data packet, extracting the Extended Association Object from the field for a copy of the Extended Association Object, comparing the Extended Association Object to the copy of the Extended Association Object and, if the comparing indicates a match, binding the forward tunnel to the reverse tunnel.

6. The method of claim 2, wherein the forward tunnel dynamic control message includes a forward path identifier identifying a forward path from the source node to the destination node, including a sequence of nodes, and wherein forwarding the forward data packet to the destination node includes:
    forwarding the forward data packet from a first node among the sequence of nodes to a second node among the sequence of nodes, through a segment of the forward data channel extending from the first node to the second node, extracting, at the second node, the forward path identifier and, based on the forward path identifier, identifying a next node in the sequence of nodes, and regenerating the forward data packet at the second node and forwarding the regenerated forward data packet through another segment of the data channel, to the next node.

7. The method of claim 2, wherein the forward data channel is an assigned Generic Associated Label (GAL) channel associated with a given GAL label number, within a Generic Associated Channel (G-ACH) channel established in links interconnecting nodes of the MPLS-TP network.

8. The method of claim 7, wherein the forward data packet has a G-ACH header and a GAL label number corresponding to the given GAL label number, wherein the dynamic control plane protocol is according to Resource Reservation Protocol-Traffic Engineering (RSVP-TE) protocol, and wherein the forward tunnel dynamic control message is according an RSVP-TE PATH request message, and includes a source end-point node ID associated with the source node, a destination end-point node ID associated with the destination node, and a tunnel ID associated with the forward tunnel.

9. The method of claim 7, wherein the data plane protocol is a supplemented GAL/G-ACH protocol comprising a G-ACH header and a GAL label number corresponding to the given GAL label number, and includes a tunnel association state coordination protocol type-length-value (TASV TLV) object, and wherein the TASC TLV object includes a tunnel control message type and an associated tunnel control message data.

10. The method of claim 9, wherein the tunnel control message type is selectable among a plurality of different tunnel control message types, and wherein the plurality of different tunnel control message types includes a Create a Tunnel Association and a Delete a Tunnel Association.

11. The method of claim 1, further comprising:
receiving and processing the reverse tunnel dynamic control message at a second set of one or more intermediate nodes, the processing comprises installing at local path state to the source node at each of the second set and re-generating a substantial replica of the reverse tunnel dynamic control message to forward towards the source node.

12. The method of claim 1, wherein the forward tunnel is a primary forward tunnel and the reverse tunnel is a primary reverse tunnel, and further comprising:
dynamic provisioning a backup forward tunnel from the source node to the destination node using in-band messaging of a backup forward tunnel dynamic control message; and
provisioning a backup reverse tunnel from the source node to the destination node using in-band messaging of a backup reverse tunnel dynamic control message.

13. A multi-protocol label switched transport protocol (MPLS-TP) router configured to support a bi-directional associated tunnel, comprising:
a control plane processor module, configured to generate a dynamic tunnel control message according to a given control plane protocol;
an encapsulation module, coupled to the control plane processor module, configured to encapsulate the dynamic tunnel control message in a data packet according to a data plane protocol;
a data channel interface module, coupled to the encapsulation module, and configured to interface with a data plane channel, and further configured to forward the data packet through the data plane channel to another MPLS-TP router;
wherein, when the MPLS-TP router is a Label Edge Router (LER) for the bi-directional associated tunnel, the dynamic tunnel control message is utilized to provision and control the bi-directional associated tunnel,
wherein, when the MPLS-TP router is a Label Switching Router (LSR) for the bi-directional associated tunnel, the dynamic tunnel control message is utilized to provision a local path state towards an endpoint of the bi-directional associated tunnel and to re-generate a substantial replica of the dynamic tunnel control message to forward towards the endpoint; and
wherein the re-generated substantial replica is forwarded at the one or more intermediate nodes the substantial replica through a Generic Associated Label (GAL) Generic Associated Channel (G-ACH) channel in an MPLS-TP link to a next downstream node identified by an extracted Explicit Route Object (ERO).

14. The MPLS-TP router of claim 13, wherein the data channel interface module is further configured to receive a data packet and to output, in a response, a received data packet, and wherein the MPLS-TP router further comprises:
a detection module, coupled to the data channel interface module, and configured to detect that the received data packet is structured according to the data plane protocol and encapsulating another dynamic tunnel control message; and
an extraction module, coupled to the detection module, configured to extract an information from the dynamic tunnel control message encapsulated in the received data packet.

15. The MPLS-TP router of claim 14, wherein the control plane processor module, is further configured to:
generate the dynamic tunnel control message as a PATH type message according to the Resource Reservation Protocol-Traffic Engineering (RSVP-TE) protocol,
include with the PATH type message an Extended Association Object associated with the forward tunnel, and
store the Extended Association Object.

16. The MPLS-TP router of claim 15, wherein the detection module is further configured to detect that the received data packet is a reverse data packet that encapsulates a reverse tunnel dynamic control message associated with a provisioning of a reverse tunnel, and wherein the extraction module is further configured to extract an information from the reverse tunnel dynamic control message and to determine, based at least in part on the information and the stored Extended Association Object, if the reverse tunnel is associated with the forward tunnel.

17. The MPLS-TP router of claim 16, wherein the control plane processor module is further configured to bind the reverse tunnel to the forward tunnel, based at least in part on a determination that the reverse tunnel is associated with the forward tunnel, the reverse tunnel to the forward tunnel.

18. A system for provisioning a bi-directional associated tunnel in a multi-protocol label switching transport protocol (MPLS-TP) network of nodes, comprising:
a processor configured to dynamically provision a forward tunnel in a data plane from a source node to a destination node, configured to include in the provisioning an in-band messaging of a forward tunnel dynamic control message within the data plane, between the source node and the destination node;
a processor configured to receive and process the forward tunnel dynamic control message at one or more intermediate nodes, wherein a local path state is installed to the destination node at each of the one or more intermediate nodes and re-generating a substantial replica of the forward tunnel dynamic control message to forward towards the destination node; and a processor configured to provision a reverse tunnel from the source node to the destination node, configured to include in said provisioning an in-band messaging within the data plane of a reverse tunnel dynamic control message;

wherein the processors are a single processor or multiple processors; and wherein the re-generating a substantial replica of the forward tunnel dynamic control message to forward towards the destination node comprises forwarding at the one or more intermediate nodes the substantial replica through a Generic Associated Label (GAL) Generic Associated Channel (G-ACH) channel in an MPLS-TP link to a next downstream node identified by an extracted Explicit Route Object (ERO).

19. The system of claim 18, wherein the processor configured to dynamically provision a forward tunnel is further configured to include in the forward tunnel dynamic control message an Extended Association Object associated with the forward tunnel, and wherein the system further comprises a processor configured to bind the forward tunnel to the reverse tunnel based, at least in part, on the in-band messaging of the Extended Association Object.

\* \* \* \* \*